United States Patent
Ezaki

(10) Patent No.: US 8,312,252 B2
(45) Date of Patent: *Nov. 13, 2012

(54) CONTENT RECEIVING APPARATUS AND METHOD, STORAGE MEDIUM, AND SERVER

(75) Inventor: Tadashi Ezaki, Tokyo (JP)

(73) Assignee: Sony Corporation (JP)

( * ) Notice: Subject to any disclaimer, the term of this patent is extended or adjusted under 35 U.S.C. 154(b) by 353 days.

This patent is subject to a terminal disclaimer.

(21) Appl. No.: 11/114,505

(22) Filed: Apr. 26, 2005

(65) Prior Publication Data

US 2005/0187880 A1     Aug. 25, 2005

Related U.S. Application Data

(63) Continuation of application No. 09/978,416, filed on Oct. 16, 2001, now Pat. No. 7,035,827.

(30) Foreign Application Priority Data

Oct. 17, 2000   (JP) ................ P2000-316395

(51) Int. Cl.
H04L 29/00 (2006.01)
H04L 12/24 (2006.01)

(52) U.S. Cl. ................ 712/220; 710/8; 705/51

(58) Field of Classification Search ............ 712/220; 710/8

See application file for complete search history.

(56) References Cited

U.S. PATENT DOCUMENTS

| | | | | |
|---|---|---|---|---|
| 5,371,706 A | * | 12/1994 | Krentz et al. | 365/185.2 |
| 5,371,746 A | * | 12/1994 | Yamashita et al. | 714/38.12 |
| 5,557,796 A | * | 9/1996 | Fehskens et al. | 712/220 |
| 5,809,145 A | * | 9/1998 | Slik et al. | 705/52 |
| 5,832,219 A | * | 11/1998 | Pettus | 709/203 |
| 5,892,900 A | * | 4/1999 | Ginter et al. | 726/26 |
| 5,946,464 A | * | 8/1999 | Kito et al. | 709/202 |
| 5,968,175 A | | 10/1999 | Morishita et al. | |
| 5,987,126 A | * | 11/1999 | Okuyama et al. | 380/203 |
| 6,223,217 B1 | * | 4/2001 | Pettus | 709/219 |
| 6,223,288 B1 | * | 4/2001 | Byrne | 713/190 |
| 6,226,618 B1 | * | 5/2001 | Downs et al. | 705/1 |
| 6,438,591 B1 | * | 8/2002 | Fehskens et al. | 709/223 |

(Continued)

FOREIGN PATENT DOCUMENTS

JP      2000134551 A      5/2000

(Continued)

OTHER PUBLICATIONS

"Microsoft® Windows Media™ Player 6.4", Microsoft Corporation.*

(Continued)

*Primary Examiner* — Evens J Augustin

(74) *Attorney, Agent, or Firm* — Lerner, David, Littenberg, Krumholz & Mentlik, LLP

(57) ABSTRACT

A content receiver is compatible with a plurality of rights management and protection methods (RMP) devised for each content distribution system. Only the format which specifies the specification of the RMP formed of information such as content billing, security, and copyright protection, is standardized. Each content provider inputs encrypted content and rights processing information to content in a form conforming to the standardized specification. For content users, by merely being provided with functions corresponding to each RMP method in advance, even if the content is based on any RMP method, the content can be decrypted and used in the same content receiver.

22 Claims, 14 Drawing Sheets

U.S. PATENT DOCUMENTS

| | | | |
|---|---|---|---|
| 6,449,660 B1* | 9/2002 | Berg et al. ............................ | 710/1 |
| 6,473,824 B1* | 10/2002 | Kreissig et al. ............ | 348/222.1 |
| 6,631,406 B1* | 10/2003 | Pantages et al. .............. | 709/223 |
| 6,654,753 B1* | 11/2003 | Arda et al. ..................... | 707/798 |
| 6,668,246 B1* | 12/2003 | Yeung et al. ..................... | 705/57 |
| 6,728,884 B1 | 4/2004 | Lim | |
| 6,772,220 B1* | 8/2004 | McVeigh ...................... | 709/238 |
| 6,772,344 B1 | 8/2004 | Chan | |
| 7,010,697 B2* | 3/2006 | Byrne et al. .................. | 713/193 |
| 7,124,437 B2* | 10/2006 | Byrne et al. ..................... | 726/19 |
| 7,356,847 B2* | 4/2008 | Byrne et al. ..................... | 726/28 |
| 7,743,427 B2* | 6/2010 | Byrne et al. ..................... | 726/30 |
| 7,770,230 B2* | 8/2010 | Byrne et al. ..................... | 726/30 |
| 2001/0013021 A1 | 8/2001 | Saito | |
| 2002/0026507 A1* | 2/2002 | Sears et al. .................... | 709/224 |
| 2004/0054630 A1 | 3/2004 | Ginter et al. | |

FOREIGN PATENT DOCUMENTS

| | | |
|---|---|---|
| WO | 00/08909 | 2/2000 |

OTHER PUBLICATIONS

Windows Media Player 6.4 download page, http://www.microsoft.com/downloads/details.aspx?FamilyID=b7a3f087-b81d-4dbe-a792-e587676a1533&displaylang=en.*

Berghel et al., 'Digital Watermarking', Jan. 2, 1997.

Office Action from Japanese Application No. 2000-316395, dated Aug. 3, 2010.

2007 (GYO-KE) 10239 th judgment (htpp://www.courts.gov.jp/hanrei/pdf20080306163050.pdf).

Yukio Hirohata, Basic knowledge of Windows 2000 practical use that an engineer wants to know, Interface, Japan, CQ publication Co., Ltd, Jun. 1, 2000, vol. 26, No. 6, p. 71-p. 86. (English translation of Japanese Office Action indicates degree of relevance).

Office Action from Japanese Application No. 2010-197021, dated Apr. 19, 2011.

* cited by examiner

CONTENT RECEIVING APPARATUS AND METHOD, STORAGE MEDIUM, AND SERVER

CROSS-REFERENCE TO RELATED APPLICATIONS

This application is a continuation of U.S. patent application Ser. No. 09/978,416, filed Oct. 16, 2001, now U.S. Pat. No. 7,035,827, issued Apr. 25, 2006, which claims the benefit of priority from Japanese Application No. P2000-316395, filed Oct. 17, 2000, the disclosures of which are hereby incorporated by reference herein.

BACKGROUND OF THE INVENTION

The present invention relates to a content receiving apparatus and a content receiving method for receiving content distributed via broadcast waves, a network, etc., and, particularly, relates to a content receiving apparatus and a content receiving method with which a specific user receives chargeable content distributed in an encrypted form, such as movies and music.

More particularly, the present invention relates to a content receiving apparatus and a content receiving method for receiving encrypted content which is distributed by a content producer/provider of movies and music through an intermediary, such as a broadcaster and an Internet service provider, and, particularly, relates to a content receiving apparatus and a content receiving method for receiving content in a form in which billing for content use and security can be controlled by the content producer/provider itself.

With the recent innovation of information technology, various media, such as movies and music, have been handled as digitized content on an information device such as a computer. Furthermore, with the advances in information communication technology, this content can be distributed by using a broadcast using satellite or terrestrial waves or by using a wide-area network such as the Internet.

Distribution of video content and music content has already been performed in some places. By using content distribution technology, conventional commodity distribution channels and physical media can be ignored. It is also possible for a consumer at a remote location to easily obtain desired video and music software. Furthermore, from the standpoint of the content producer/provider, since high profits are made from quick and efficient content sales, content production enthusiasm increases, and this leads to the development of the entire industry.

For example, in a server-type/storage-type broadcasting system on a precondition that a television receiver contains a large-capacity hard disk device, profits can be surely realized by distributing content, such as movies, which is encrypted by a broadcasting station and other content distributors, and by billing a content purchaser when a key for decrypting encryption is distributed to a content purchaser, that is, a viewer.

Such a content receiving method is also called a "CAS (Conditional Access System)". FIG. 14 shows the overall construction of a CAS-based content distribution system.

The content distribution system shown in FIG. 14 is constituted of three parties: a content provider which produces or provides content for distribution, such as video and music; a content distributor for distributing to users content provided by the content provider via broadcast waves and a network; and consumers who receive content, that is, ordinary users.

The content distributor is constituted of, for example, a broadcaster using a broadcasting satellite such as a BS (Broadcasting Satellite) or a CS (Communication Satellite), a broadcaster using terrestrial waves, and an Internet service provider which manages connection services to the Internet and services for providing various information content on the Internet.

Ordinary users have a content receiver installed, for example, in one's own household for receiving the distributed content. The content receiver for receiving content via broadcast waves may be, for example, a television receiver such as an STB (Set Top Box). Furthermore, the content receiver for receiving content via the Internet may be, for example, an ordinary computer system such as a personal computer (PC). It is preferable that the content receiver have a built-in hard disk device and be a storage-type broadcast-compatible receiver capable of storing large amounts of video and music contents over a long period of time.

In order for the content receiver to receive content via broadcast waves, the content receiver must include a CAS (Conditional Access System) card corresponding to each broadcaster. Furthermore, in order to receive content via the Internet, it is necessary to obtain a user account (user entitlement) in advance from a predetermined Internet service provider and is necessary to connect to the Internet via a nearby access point when content is purchased.

In order for the broadcaster to collect costs required for content distribution and profits, for example, the time in which a CAS card (or a receiver in which CAS is contained) is purchased may be used. Furthermore, in order to collect costs required for content distribution and profits, for example, money corresponding to a content use fee may be added to the subscription which is paid monthly. However, the billing method by a CAS system and a user account aims to control billing for individual consumers, that is, content users, by a content distributor, and is not under the control of a content provider. In other words, the content provider cannot secure an individual profit even if the CAS of the content distributor itself is used.

In order for the content provider to collect a content use fee from ordinary users, the content provider itself may devise a content providing method (hereinafter referred to as an "RMP (Rights Management & Protection)" for content billing, security, and copyright protection. The RMP, more specifically, includes indispensable items for purchasing content and using content, such as an encryption method, a key distribution method, a content encryption/decryption method, a billing information and keys transmission method, recording medium control information, a mutual authentication method, APS (Analog Protection System: macrovision, CGMS (Copy Generation Management System), etc.), and viewing limitation information. On the side of content users/consumers, by being provided with a content receiver in which an RMP module corresponding to a content provider is mounted, distributed content in which the content provider is a supply source is purchased successfully, and can be used, that is, viewed. Furthermore, collective management of billing information may be entrusted to a settlement organization, such as a management center, other than a content provider.

However, for the RMP method regarding content billing, security, and copyright protection, generally, the current situation is that the RMP method is devised individually for each content distribution system provided by each content provider. In an environment in which a plurality of methods coexist, things fall into a state in which, even with the same music content distribution or movie content distribution, if the content distribution system differs, the content cannot be decrypted on the same content receiver, that is, the content cannot be used.

For example, if a content user tries to purchase content from a plurality of content providers, that is, distribution systems, hardware or software of a content receiver must be provided for each distribution system, causing inconvenience for users or necessitating extra expenses. Furthermore, if restrained purchasing of users occurs as a natural consequence of the content purchasing method being troublesome, the profits of the content providing/distribution business become stagnated, and the entire business will cool down.

SUMMARY OF THE INVENTION

It is desirable to provide a superior content receiving apparatus and a superior content receiving method with which a specific user can suitably receive chargeable content, such as movies and music, distributed in an encrypted form.

It is further desirable to provide a superior content receiving apparatus and a superior content receiving method which are capable of suitably receiving encrypted content distributed by a content producer/provider of movies and music via an intermediary such as a broadcaster or an Internet service provider.

It is also desirable to provide a superior content receiving apparatus and a superior content receiving method which are capable of suitably receiving content distributed in a form in which billing for content use and security can be controlled by the content producer/provider itself.

It is additionally desirable to provide a superior content receiving apparatus and a superior content receiving method which are compatible with a plurality of RMP (Rights Management & Protection) methods which are devised for each content distribution system.

According to a first aspect of the present invention, there is provided a content receiving apparatus including a receiver operable to receive content distributed in accordance with a rights management and protection method; an identification unit operable to identify the rights management and protection method for the received content; and a rights processing unit operable to perform rights processing of the received content in accordance with the identified rights management and protection method.

A content producer/provider distributes content in a protected form such as encryption in accordance with a rights management and protection method called "RMP". Generally, a different rights management and protection method is adopted by each content producer/provider.

According to the content receiving apparatus in accordance with the first aspect of the present invention, by standardizing only the format which specifies the specification of the rights management and protection method, it is possible for the identification unit to identify the rights management and protection method of the received content, and it is possible for the rights processing unit to perform rights processing of the received content by selectively using the identified rights management and protection method.

Therefore, by merely providing functions that correspond to each rights management and protection method in advance, even when content conforming to any rights management and protection method is received, it is possible to deal with a plurality of different content distribution methods by using one content receiver. That is, content can be decrypted and used on the same content receiver, obviating the need to provide a device such as a receiver for each distribution system.

Furthermore, among content producers/providers/distributors, competition over the standardization of the content distribution method, such as the RMP specification description, can be lessened. Furthermore, compatibility and flexibility of distributed content among content producers/providers/distributors can be improved. Also, from the standpoint of content users, convenience is improved.

The rights management and protection method referred to herein specifies indispensable items for purchasing content and using content, such as a content encryption method, a key distribution method, a content decryption method, a billing information and keys transmission method, recording medium control information, a mutual authentication method, APS (Analog Protection System: macrovision, CGMS (Copy Generation Management System), etc.), and viewing limitation information.

The content receiving apparatus may include a plurality of types of rights management and protection modules in advance. In such a case, it is possible for the rights processing unit to select a predetermined type of the rights management and protection modules based on the identified rights management and protection method in order to perform rights processing of the received content.

Alternatively, the content receiving apparatus may further include a rights management and protection module acquiring unit operable to externally acquire a rights management and protection module. In such a case, it is possible for the rights management and protection module acquiring unit to externally acquire a selected rights management and protection module based on the identified rights management and protection method, and for the rights processing unit to perform rights processing of the received content by using the selected rights management and protection module.

Alternatively, the content receiving apparatus may further include a rights management and protection module creation unit operable to automatically create a selected rights management and protection module based on the identified rights management and protection method. In such a case, it is possible for the rights processing unit to perform rights processing of the received content by using the selected rights management and protection module.

The content receiving apparatus may further include a content storage unit operable to store received content. For example, content before rights processing by the rights processing unit or content after rights processing may be stored in the content storage unit.

The content received by the receiver is encrypted in advance, for example, by a predetermined key. In such a case, the rights processing unit may decrypt the received encrypted content, may reencrypt it using another key, and, thereafter, may store the reencrypted content in the content storage unit. With such a construction, the content after rights processing can be protected even more.

The content received by the receiver is distributed in a form encrypted by, for example, a predetermined key. Furthermore, the receiver receives the predetermined key encrypted by a second key. In such a case, the rights processing unit may decrypt the encrypted predetermined key, may reencrypt the decrypted key using another key, and, thereafter, may store the reencrypted key, together with the encrypted content, in the content storage unit. With such a construction, the content after rights processing can be protected even more.

The rights processing unit may store a log of rights processing of the received content. In such a case, for example, by transmitting the stored log to a predetermined settlement organization periodically or non-periodically, it is possible for the settlement organization to perform an accurate billing process.

The rights processing unit may perform an APS (Analog Protection System) process on a playback signal of content after rights processing based on the identified rights management and protection method, and may externally output the playback signal. In such a case, it is possible to protect video playback signals after rights processing.

The rights processing unit may encrypt the content after rights processing, and may externally output the content. In such a case, it is possible to protect content even when content is to be transferred to another information device via a home network such as, for example, IEEE 1394, and even when content is to be transmitted to a computer system such as a personal computer (PC) via a LAN and is processed using an application.

According to a second aspect of the present invention, there is provided a content receiving method. The content receiving method includes receiving content distributed in accordance with a rights management and protection method; identifying the rights management and protection method for the received content; and performing rights processing of the received content in accordance with the identified rights management and protection method.

According to the content receiving method of the present invention, by standardizing only the format which specifies the specification of the rights management and protection method, it is possible for the identification step to identify the rights management and protection method of the received content, and it is possible for the rights processing step to perform rights processing of the received content by selectively using the identified rights management and protection method.

In the rights processing step, a predetermined type of rights management and protection module may be selected based on the identified rights management and protection method, and rights processing of the received content may be performed in accordance with the predetermined type of rights management and protection module.

The content receiving method may further include externally acquiring a selected rights management and protection module based on the identified rights and management and protection method. In such a case, in the rights processing step, rights processing of the received content may be performed by using this selected rights management and protection module.

The content receiving method may further include automatically creating a rights management and protection module based on the identified rights management and protection method. In such a case, in the rights processing step, rights processing of the received content may be performed by using this selected rights management and protection module.

The content receiving method may further include storing received content. For example, content before rights processing or content after rights processing in the rights processing step may be stored.

The content receiving step may include receiving content encrypted by a predetermined key. In such a case, the content receiving method may further include decrypting the encrypted content; reencrypting the decrypted content using another key; and storing the reencrypted content.

The content receiving step may include receiving content encrypted by a predetermined key and receiving the predetermined key encrypted by a second key. In such a case, the content receiving method may further include decrypting the encrypted predetermined key; reencrypting the decrypted key using another key; and storing the reencrypted key together with the encrypted content.

The content receiving method may further include storing a log of rights processing of the received content. In such a case, for example, by transmitting the stored log to a predetermined settlement organization periodically or non-periodically, it is possible for the settlement organization to perform an accurate billing process.

The content receiving method may further include performing an APS (Analog Protection System) process on a playback signal of content after rights processing based on the identified rights management and protection method, and externally outputting the playback signal.

The content receiving method may further include encrypting content after rights processing, and externally outputting the content.

According to a third aspect of the present invention, there is provided a storage medium having physically recorded thereon, in a computer-readable form, a program for receiving content, the program including receiving content distributed in accordance with a rights management and protection method; identifying the rights management and protection method for the received content; and performing rights processing of the received content in accordance with the identified rights management and protection method.

The storage medium in accordance with the third aspect of the present invention is, for example, a medium for physically providing computer software in a computer-readable form to a general-purpose computer system which is capable of executing various program codes. Such a medium is, for example, a removable and portable storage medium, such as a CD (Compact Disc), an FD (Floppy Disc), and an MO (Magneto-Optical Disc). Alternatively, it is technically possible to provide computer software in a computer-readable form to a specific computer system via a transmission medium, such as a network (it does not matter whether the network is a wireless one or a wired one).

Such a medium is such that structural or functional cooperation relationships between computer software and the storage medium for realizing the functions of predetermined computer software in a computer system are defined. In other words, by installing predetermined computer software onto a computer system via a storage medium in accordance with the third aspect of the present invention, cooperative operations are exhibited in the computer system, and operational effects similar to the content receiving apparatus and the content receiving method in accordance with the first and second aspects of the present invention can be obtained.

According to a fourth aspect of the present invention, there is provided a server including means for storing a plurality of types of rights management and protection modules corresponding to respective rights management and protection methods; and means for transmitting a selected one of the rights management and protection modules in response to a request containing information identifying the selected rights management and protection module.

According to a fifth aspect of the present invention, there is provided a server including means for storing a plurality of types of rights management and protection modules corresponding to respective rights management and protection methods; means for selecting one of the rights management and protection modules based on identification information; and means for converting content by using the selected rights management and protection module.

Further objects, features and advantages of the present invention will become apparent from the following description of the preferred embodiments with reference to the attached drawings.

DETAILED DESCRIPTION

In the embodiments (to be described below) of the present invention, a description will be given of a content receiving apparatus which is compatible with a plurality of RMPs which are devised for each content distribution system.

RMP is an abbreviation for rights management & protection, and is a concept used in the TV Anytime Forum. Problems in businesses which distribute content via broadcasts and networks are unauthorized use of content, viewing without paying a fee, and listening without paying a fee. If these types of fraudulent acts prevail, proper profits of the content producer/provider/distributor are not ensured, which is of critical importance for the business. In other words, content use rights management and protection is necessary, and the RMP takes charge of this.

The RMP, more specifically, includes indispensable items for purchasing content and using content, such as an encryption method, a key distribution method, a content encryption/decryption method, a billing information and key transmission method, recording medium control information, a mutual authentication method, APS (Analog Protection System: macrovision, CGMS (Copy Generation Management System), etc.), and viewing limitation information.

Only the formatting which specifies the specification of the RMP composed of these items may be standardized, so that each content distributor need only input encrypted content and rights processing information into the content in a form conforming to the specification. In such a case, from the standpoint of consumers who receive and use content, that is, content users, by being provided with a plurality of functions corresponding to individual RMP methods, even if the content is based on any RMP method, it is possible to decrypt and use the content on the same content receiver.

The RMP specification can be described, for example, as a part of metadata associated with distributed content. Hereinafter, that portion of the metadata which is related to the RMP specification description is called "rights processing metadata". For example, in the case of digital broadcasts, metadata can be distributed as data for data broadcasts, which is associated with the main part of a broadcast program.

Figure 1:
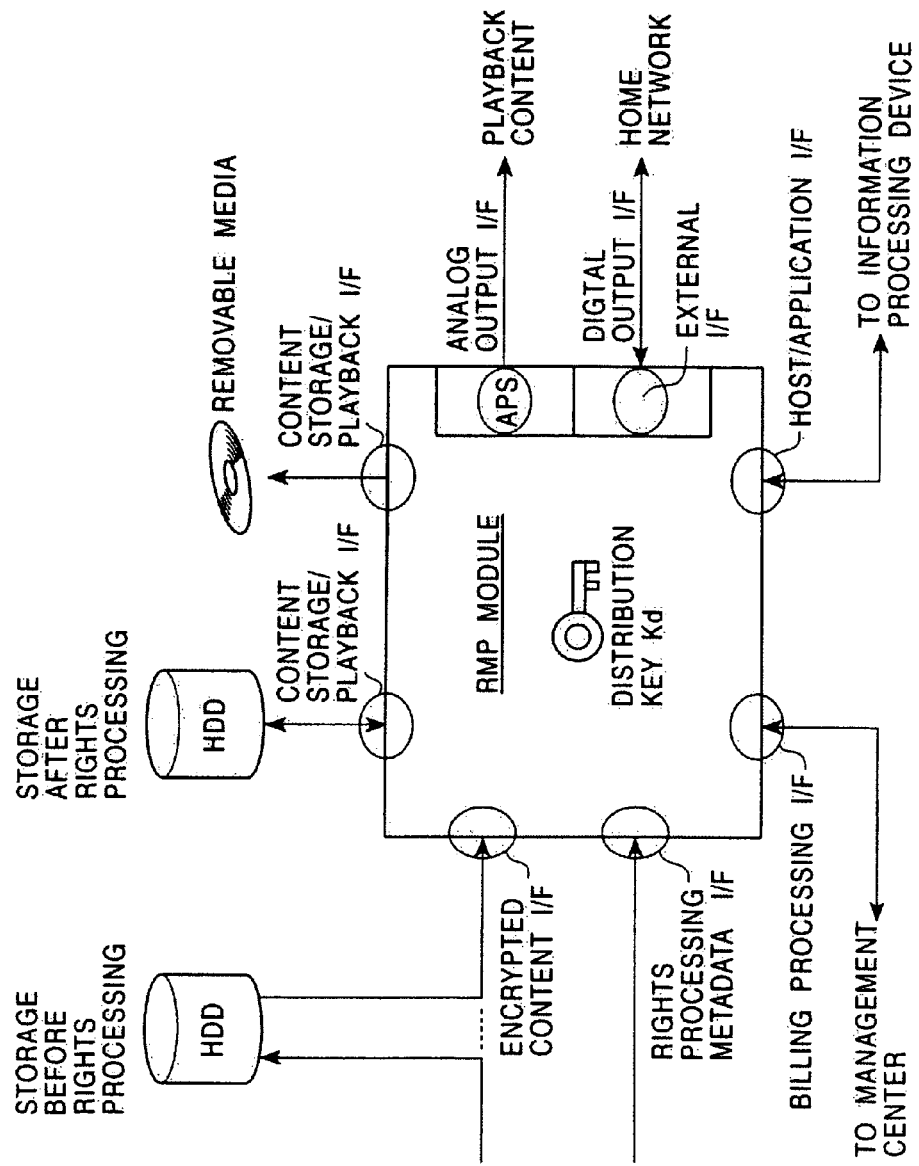
FIG. 1 shows a conceptual construction of an RMP module.

FIG. 1 shows a conceptual construction of an RMP module. The RMP module is used by being built in a content receiver in the form of an STB (Set Top Box) and in other forms, and can be mounted using a predetermined hardware or software module. As shown in FIG. 1, the RMP module is formed to have several interfaces for performing data input/output with respect to received content.

Content received via a broadcast such as satellite waves or terrestrial waves or content downloaded via a network such as the Internet is stored in a large-capacity storage device, such as a hard disk device, together with metadata. The RMP module inputs received content in a state before rights processing via a hard disk device or directly without going through a hard disk device.

The main part of the content, such as video and music, is encrypted in advance for the purpose of content protection. Therefore, a decryptor for decrypting the encrypted content is necessary, and the RMP module has an encrypted-content input interface for inputting encrypted content in accordance with a specified encryption algorithm.

Also, metadata is distributed in such a manner as to correspond to each content, with information indicating a rights process for content and necessary rights protection, that is, rights processing metadata, being contained therein.

The rights processing metadata contains keys for decrypting content, content purchasing conditions, use conditions, and copy control information for decrypted content. The RMP module has a rights processing metadata input interface for inputting information regarding rights processing and protection in accordance with a specified format.

The distributed content is encrypted, for example, using a content key, and this content key is transmitted together with encrypted content in a form in which the content key is further encrypted using a distribution key. Within the RMP module, the distribution key is held, allowing the encrypted content key to be decrypted using this distribution key and furthermore allowing the encrypted content to be decrypted using the decrypted content key. According to such an encryption and transmission method, content distribution can be performed safely while changing the content key for each content, and since the RMP module holds a single distribution key, the encrypted content can be decrypted and used. The rights processing metadata input interface of the RMP module may input the encrypted content key as rights processing metadata.

Furthermore, the specification regarding billing for content use, devised by the content producer/provider, may also be contained in the rights processing metadata, and the rights processing metadata input interface of the RMP module may input this data.

For the specification regarding billing, for example, price information, and use conditions (playback billing for each time, a limitation of the number of times in which a playable number of times is prespecified, a limitation of the period in which playback is possible up to a predetermined date, etc.) can be specified.

For a billing process with respect to a content user, a settlement organization, such as a management center, other than a content producer/provider/distributor, may be set up. The RMP module has a billing process interface which is connected to such a management center in order to conduct transactions regarding billing and settlement. The RMP module creates a billing log, for example, each time content stored on the hard disk device is played back, and connects to the management center at predetermined time intervals in order to transmit the log. In response, the management center can perform billing and a settlement process on the basis of the log sent from each content user.

The RMP module, as has already been stated, has an encrypted content interface for inputting received content before rights processing. The RMP module has an interface for storing content after rights processing again on a hard disk device for the purpose of using content for several times, and an interface for storing content after rights processing on removable media such as a DVD (Digital Versatile Disc) for the purpose of permanently or semi-permanently storing content. Such an interface for storing and playing back content after rights processing can specify control for media during encryption of content for storage and during decryption at playback time, presence or absence of authentication for media, and an authentication method.

Also, the RMP module has an external output interface for playing back received content or content read from the hard disk device or a removable medium on a display or other external devices. In the example shown in FIG. 1, an analog output interface for displaying and outputting a video signal on a display, and a digital output interface for transferring content to an external device via a home network such as IEEE 1394 are provided. For the analog output interface, APS (Analog Protection System) is adopted to protect content in analog form. The APS includes macrovision, CGMS (Copy Generation Management System)-A for embedding copy control information to a predetermined scanning line in a vertical retrace interval, SCMS (Single Copy Management System), etc. Also, the digital output interface can perform control of authentication bus encryption, such as 1394CP, in addition to transmission content encryption.

Also, by transferring content after rights processing, a process using a desired application can be performed on an information processing device such as a personal computer (PC). In the example shown in FIG. 1, the RMP module has a host/application interface for outputting content to an external information processing device. The host/application interface performs control such as the encryption of transmission content.

The RMP module may be realized by implementing a dedicated hardware component or by executing predetermined program code on a general-purpose processor. The specification regarding the RMP can be distributed as rights processing metadata in such a manner as to be associated with the distributed content (described above).

An example of the RMP specification description format is shown below.

```
RMP ID::=INTEGER{XXXXXXXX}
Contents Encryption Algorithm::=SEQUENCE{
        algorithm           3DES
        developer           Public
        download            URL
        key length          112
        key party           16
        key name            Content Key
}
Content Key Encryption Algorithm::=SEQUENCE{
        algorithm           DES
        developer           Public
        download            URL
        key length          56
        key party           8
        key name1           Distribution Key
        key name2           Storage Key
}
Distribution Key Encryption Algorithm::=SEQUENCE{
        algorithm           None
}
Storage Key Encryption Algorithm::=SEQUENCE{
        algorithm           None
}
Authentication Algorithm::=SEQUENCE{
        algorithm           DES
        developer           Public
        download            URL
        ECC parameter p     xxxxxxxxxxxxxxxx
        ECC parameter a     xxxxxxxxxxxxxxxx
        ECC parameter b     xxxxxxxxxxxxxxxx
        ECC parameter g     xxxxxxxxxxxxxxxx
        ECC parameter r     xxxxxxxxxxxxxxxx
        key length          224
        key party           0
}
Log Format::=SEQUENCE{
        log serial number   xxxxxxxx
        purchase date       yyyy:mm:dd
        purchase time       hh:mm:ss
        content ID          xxxxxxxxxx
        purchase condition  xxx
        purchase limitation xxxxxx
        purchase price      xxxxxx
        copy permission     xx
}
        ...  ...  ...  ...  ...  ...
```

For the RMP specification description format shown in the foregoing, in addition to the identification information (RMP ID) for identifying the RMP method being contained at the beginning, an encryption algorithm for encrypting distributed content, an encryption algorithm for encrypting a content key Ks used to encrypt distributed content, an encryption algorithm for encrypting a distribution key Kd which is used during content distribution, a storage key Kst used to store distributed content, and a format for storing a log can be specified. For the encryption method, generally, DES (Data Encryption Standard), Multi2, etc., is used.

The specification description as the RMP is devised for each content producer/provider. Conventionally, since the RMP is fixed and used for each content distribution system, in order to receive content from a plurality of systems, extra expenses, such as a new content receiver for each system, are necessary. In comparison, in the present invention, as a result of specifying the specification description of the RMP and an interface for inputting to the RMP, by decrypting the specification or by obtaining an RMP module conforming to the specification, on the same content receiver, content billing in a plurality of content distribution systems, a security method such as encryption, and a copyright protection method can be dealt with.

One embodiment of the present invention is such that, within a content receiver or a content recording/playback device, a plurality of hardware RMP modules each having a different RMP specification implemented therein are provided in advance, and the switching to a compatible hardware RMP module for use is made for each received content.

Another embodiment of the present invention is such that an RMP module is formed as a software module, and a compatible software module is downloaded for each received content from a predetermined server, or rights processing metadata is analyzed to automatically create a desired software module on the content receiver side.

Figure 2:
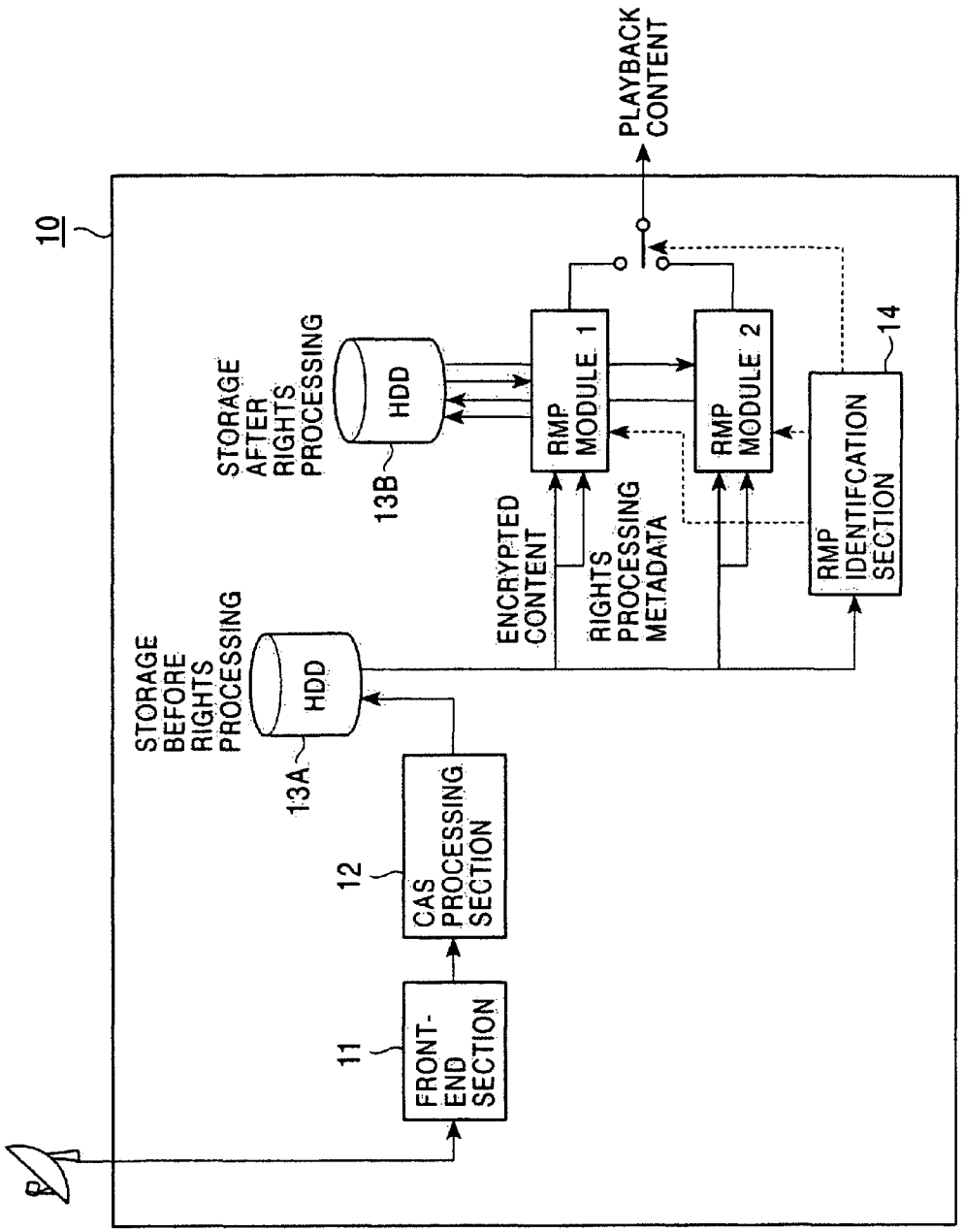
FIG. 2 schematically shows the construction of a content receiver in a form in which a plurality of hardware RMP modules each having a different RMP specification implemented therein are provided in advance, and the switching to a compatible hardware RMP module for use is made for each received content.

FIG. 2 schematically shows the construction of a content receiver 10 in a form in which a plurality of hardware RMP modules each having a different RMP specification implemented therein are provided in advance, and the switching to a compatible hardware RMP module for use is made for each received content.

The content receiver 10 shown in FIG. 2 comprises a front-end section 11, a CAS processing section 12, hard disk devices 13A and 13B for storing content, an RMP identification section 14, and two (plurality) RMP modules 1 and 2, each of which is based on a different RMP specification description.

The front-end section 11 performs a process for tuning in to broadcast waves of a predetermined channel, that is, a station-selection process, and a process of demodulating received data.

The CAS processing section 12 descrambles a scrambling process applied to broadcast content on the basis of a contract concerning CAS (Conditional Access System) exchanged with the content distributor. For digital broadcasting in Japan, a common scrambling method called "Multi2" is adopted for both BS and CS. However, since the CAS process itself is not related to the scope and spirit of the present invention, no further description is given here.

The hard disk devices 13A and 13B are used to store received content. More specifically, one of the hard disk devices 13A is used to store content in a state before rights processing by the RMP module, and the other hard disk device 13B is used to store content in a state after rights processing. However, the hard disk devices 13A and 13B need not be devices which are physically independent of each other, and may be, for example, separate storage areas (partitions) which are assigned to a single hard disk.

In this embodiment, the RMP, which is written as a part of the rights processing metadata, is assigned unique identification information (RMP ID) for identifying the method thereof. The RMP identification section 14 reads rights processing metadata from the hard disk device 13A, identifies the RMP ID, and causes one of two (plurality) RMP modules 1 and 2, that corresponds to the identified RMP ID, to be operable.

The RMP module 1 and the RMP module 2 have several interfaces (described above) for processing encrypted content such as movies and music, and the rights processing metadata associated with content. The RMP module 1 or the RMP module 2 activated by the RMP identification section 14 operates according to the RMP specification description written as the rights processing metadata, and performs content processing, such as decryption of encrypted content, external output as playback content, and storage onto the hard disk device 13B and a removable medium.

Figure 3:
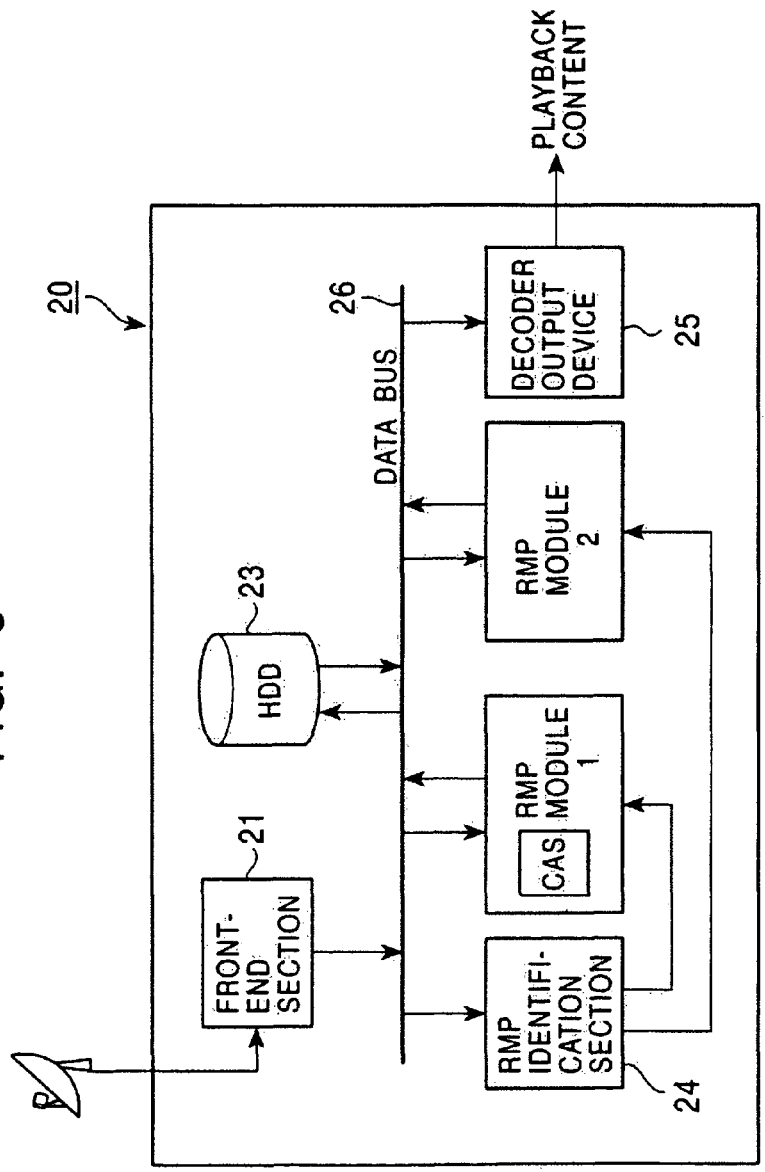
FIG. 3 schematically shows another example of the construction of a content receiver in a form in which a plurality of hardware RMP modules each having a different RMP specification implemented therein are provided in advance, and the switching to a compatible hardware RMP module for use is made for each received content.

FIG. 3 schematically shows the construction of a content receiver 20 according to another embodiment. The content receiver 20 is formed such that a plurality of hardware RMP modules each having a different RMP specification implemented therein is provided in advance, and the switching to a compatible hardware RMP module for use is made for each received content.

In the example shown in FIG. 3, the content receiver 20 is formed in such a way that a front-end section 21, a hard disk device 23, an RMP identification section 24, RMP modules 1 and 2, and a decoder output device 25 are interconnected with each other via the same data bus 26.

The front-end section 21 performs a process for tuning in to broadcast waves of a predetermined channel, that is, a station-selection process, and a process of demodulating received data. Although not shown, in a case where content is to be received from a predetermined service provider via a wide-area network such as the Internet, instead of through the medium of broadcast waves, the front-end section 21 can be realized by a network interface card.

The hard disk device 23 is used to store content in a state before rights processing by the RMP module or content in a state after rights processing.

The RMP which is written as rights processing metadata is assigned unique identification information (RMP ID) for identifying the method thereof. The RMP identification section 24 reads rights processing metadata from the hard disk device 23, identifies the RMP ID, and causes one of two (plurality) RMP modules 1 and 2, that corresponds to the identified RMP ID, to be operable.

The RMP module 1 and the RMP module 2 have several interfaces (described above) for processing encrypted content such as movies and music, and rights processing metadata associated with content. The RMP module 1 or the RMP module 2 activated by the RMP identification section 14 operates according to the RMP specification description written as rights processing metadata, and performs content processing, such as decryption of encrypted content, external output as playback content, and storage onto the hard disk device 23 and a removable medium. In a case where content is to be received from a content distributor adopting a CAS method, a CAS module for performing the corresponding decryption/descrambling process may be mounted on the RMP module.

The decoder output device 25 performs a decoding process for decoding playback content after rights processing, and external output. For example, in the case of AV content, the decoder output device 25 separates the content into compressed video data and compressed audio data. Then, the MPEG2-compressed video data is decompressed so that the original video signal is played back, and for the compressed audio data, after the data is PCM (Pulse Code Modulation)-decoded, it is combined with additional sound in order to form a playback audio signal.

Figure 4:
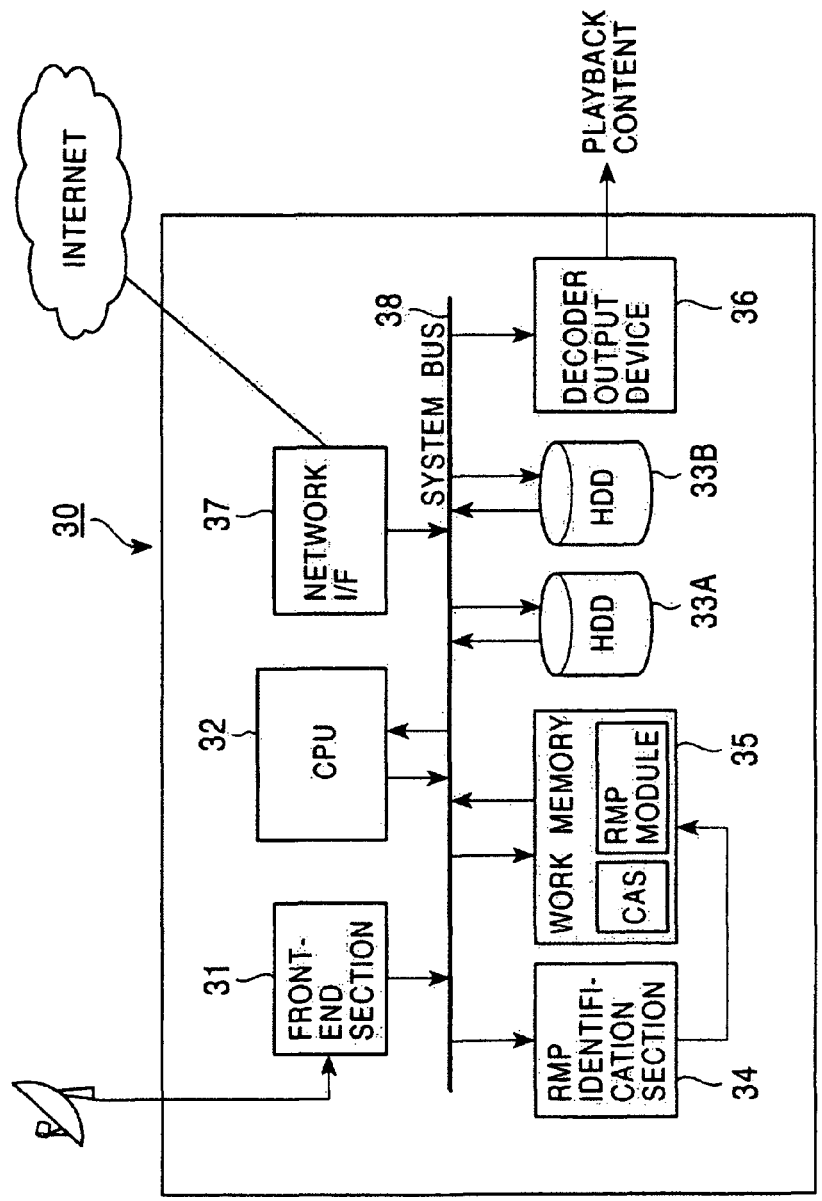
FIG. 4 schematically shows another example of the construction of a content receiver in a form in which a hardware RMP module is formed as a software module, and a compatible software module is downloaded for each received content from a predetermined server.

FIG. 4 schematically shows the construction of a content receiver 30 according to another embodiment. The content receiver 30 is formed such that an RMP module is formed as a software module, so that a software module compatible with each received content is downloaded from a predetermined server.

As shown in FIG. 4, the content receiver 30 is constructed in such a way that a front-end section 31, a CPU (Central Processing Unit) 32, hard disk devices 33A and 33B, an RMP identification section 34, a work memory 35, a decoder output device 36, and a network interface 37 are interconnected with each other via a system bus 38.

The front-end section 31 performs a process for tuning in to broadcast waves of a predetermined channel, that is, a station-selection process, and a process of demodulating received data.

The network interface 37 is a device for connecting the content receiver 30 to a wide-area network such as the Internet in accordance with a predetermined communication protocol such as TCP/IP (Transmission Control Protocol/Internet Protocol). An unlimited number of host terminals are connected on the Internet. Some of the host terminals are information distribution servers for distributing content such as movies and music, and the others are servers for distributing a software RMP module. In a case where, instead of receiving content via a broadcast, content is to be received from a predetermined service provider via a wide-area network such as the Internet, the front-end section 31 can be realized by the network interface 37.

The CPU 32 is a central controller for centrally controlling the operation inside the content receiver 30 under the control of the operating system (OS), and executes various program codes by using the work memory 35.

The hard disk device 33A is used to store content in a state before rights processing by the RMP module, and to store content in a state after rights processing. The hard disk device 33B is used to store a software RMP module which was used before (or which was downloaded in advance). The hard disk devices 33A and 33B need not be devices which are physically independent of each other, and may be, for example, storage areas (for example, partitions) which are separated on a single hard disk.

The RMP described as rights processing metadata is assigned unique identification information RMP ID for identifying the method thereof. The RMP identification section 34 reads rights processing metadata from the hard disk device 33A, identifies the RMP ID, and detects whether or not the relevant software RMP module is loaded into the work memory 35 and is currently in use. The RMP identification section 34 can be implemented as program code to be executed by the CPU 32, rather than as a hardware component.

When the software RMP module in the work memory 35 does not match the RMP ID regarding content to be played back going forward, the relevant software RMP module is searched for on the local disk 33B, and when the software RMP module is found, it replaces that in the work memory 35. When the relevant software RMP module cannot be found on the local disk 33B, the server on the network is accessed via the network interface 37 so that the desired software RMP module can be searched for.

By executing the software RMP module loaded into the work memory 35, the CPU 32 operates according to the RMP specification description written as rights processing metadata, so that content processing, such as decryption of encrypted content, external output as playback content, and storage onto the hard disk device 33A and a removable medium, can be performed. When content is to be received from a content distributor adopting a CAS method, a CAS module for performing the corresponding decryption/descrambling process may be loaded similarly into the work memory 35.

The decoder output device 36 performs a decoding process for decoding playback content after rights processing, and external output. For example, in the case of AV content, the decoder output device 36 separates the content into compressed video data and compressed audio data. Then, the MPEG2-compressed video data is decompressed so that the original video signal is played back, and for the compressed audio data, after it is PCM (Pulse Code Modulation)-decoded, it is combined with additional sound in order to form a playback audio signal.

Figure 5:
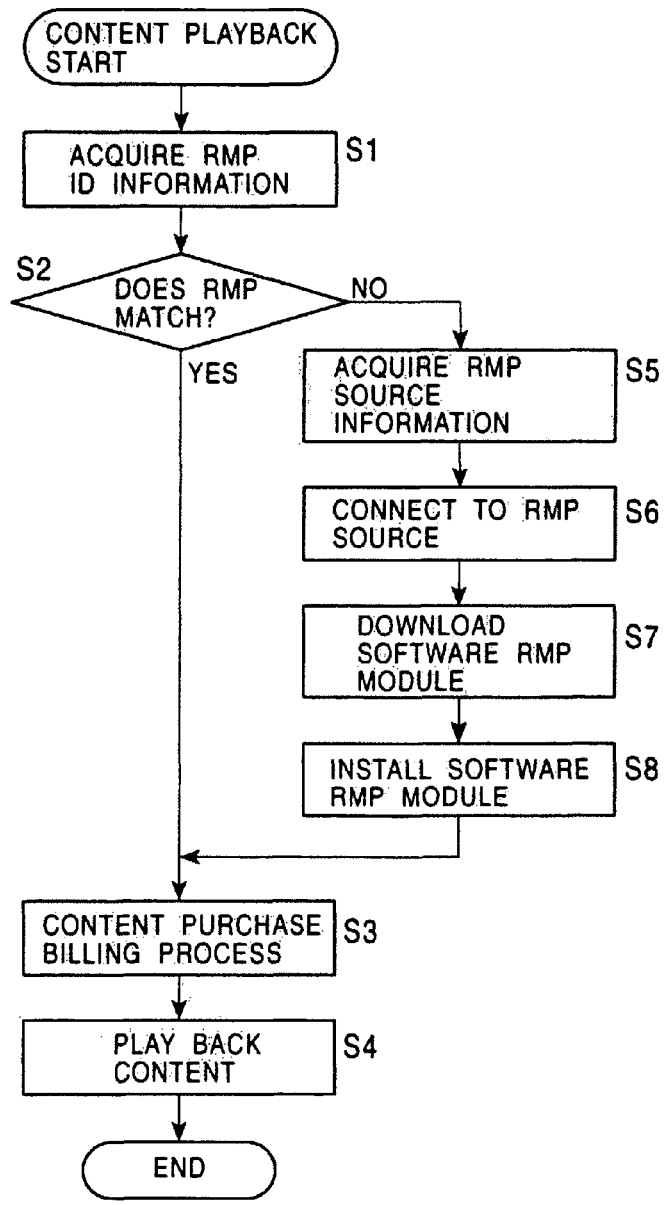
FIG. 5 is a flowchart showing a processing procedure for downloading an RMP module to the content receiver of FIG. 4.

FIG. 5 shows, in a flowchart, a processing procedure for downloading a software RMP module to the content receiver 30. A description will now be given below of a downloading process of downloading a software module in accordance with this flowchart.

When the playback of the content stored in the hard disk device 33A is to be started, corresponding rights processing metadata is similarly read from the hard disk device 33A in order to obtain the RMP ID of the RMP module (step S1). Then, it is checked whether or not this RMP ID matches that of the RMP module which is currently loaded into the work memory 35 (step S2).

When the RMP ID matches, that is, the RMP module of the content to be played back going forward has already been loaded into the work memory 35, then a connection is established with the management center. After a billing process regarding the purchase of content is performed in accordance with the RMP specification description (step S3), content playback is performed (step S4), and this entire processing routine is terminated.

When, on the other hand, the RMP ID does not match, the RMP source information is obtained (step S5), a connection is made with the server which is the RMP source (step S6), and the corresponding software RMP module is downloaded from this server (step S7). Then, the downloaded software RMP module is installed into the content receiver 30 (for example, loaded into the work memory 35) (step S8).

The RMP source information is written in, for example, URL (Uniform Resource Locator) format within the rights processing metadata. In such a case, the content receiver 30 can access the resources with respect to the server indicated by the URL via a TCP/IP network such as the Internet via the network interface 37 so as to download the corresponding RMP module in accordance with a transfer protocol such as HTTP (Hyper Text Transfer Protocol) or FTP (File Transfer Protocol).

As a result of installing a new software RMP module, the content receiver 30 can operate according to the RMP specification description written as rights processing metadata, so that content processing, such as decryption of encrypted content, external output as playback content, and storage onto the hard disk device 33A and a removable medium, can be performed.

Then, a connection is established with the management center. After a billing process regarding the purchase of content is performed in accordance with the RMP specification description (step S3), content playback is performed (step S4), and this entire processing routine is terminated.

In a modification in which an RMP module is formed as a software module, it is also possible for the CPU 32 (or another processing unit) to analyze the RMP specification description within the rights processing metadata and to automatically create a desired software RMP module within the content receiver 30.

Figure 6:
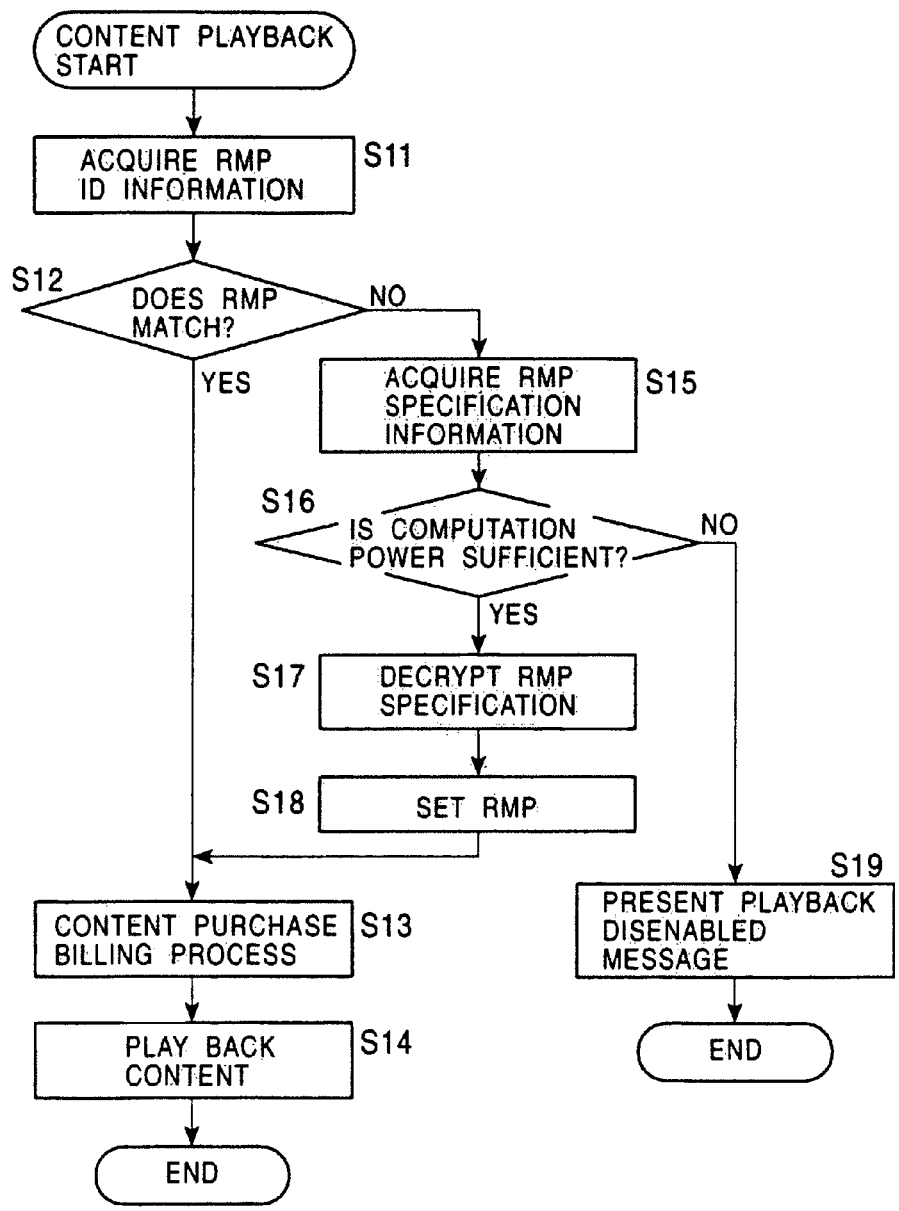
FIG. 6 is a flowchart showing a processing procedure for automatically creating a software RMP module within the content receiver of FIG. 4.

FIG. 6 shows, in a flowchart, a processing procedure for automatically creating a software RMP module within the content receiver 30. A description will now be given below of a process of automatically creating a software RMP module in accordance with this flowchart.

When the playback of the content stored in the hard disk device 33A is to be started, the corresponding rights processing metadata is similarly read from the hard disk device 33A in order to obtain the RMP ID of the RMP module (step S11). Then, it is checked whether or not this RMP ID matches that of the RMP module which is currently loaded into the work memory 35 (step S12).

When the RMP ID matches, that is, the RMP module of the content to be played back going forward has already been loaded into the work memory 35, then a connection is established with the management center. After a billing process regarding the purchase of content is performed in accordance with the RMP specification description (step S13), content playback is performed (step S14), and this entire processing routine is terminated.

When, on the other hand, the RMP ID does not match, information regarding the RMP specification description is obtained from the rights processing metadata (step S15). Then, it is checked whether or not the computing power of the content receiver 30 (for example, the calculation performance possessed by the CPU 32) is sufficient to create an RMP module (step S16).

When the computing power is insufficient, after a message informing that the playback of content is impossible is displayed (step S19), this processing routine is terminated abnormally.

When, on the other hand, the computing power is sufficient, the RMP specification description is decrypted (step S17), and the RMP is set in the work memory 35 (step S18). As a result of newly setting the RMP, the content receiver 30 can operate according to the RMP specification description written as rights processing metadata, so that content processing, such as decryption of encrypted content, external output as playback content, and storage onto the hard disk device 33A and a removable medium, can be performed.

Then, a connection is established with the management center. After a billing process regarding the purchase of content is performed in accordance with the RMP specification description (step S13), content playback is performed (step S14), and this entire processing routine is terminated.

When an RMP module is formed as a hardware module, the module cannot be easily replaced with another RMP module in comparison with a case in which a module is implemented using software. In such a case, the server may be provided with a mechanism in which the module is replaced with an RMP corresponding to the receiver. For example, the content receiver inquires the server using the ID of the content so as to request the conversion of content. If the rights processing conditions are satisfied, conversion into a predetermined RMP is possible, and by downloading the converted content (or it may be that the same content has been provided in advance) into the content receiver of the request source, it is possible to realize the decryption and playback of the desired content.

Next, a description is given of an embodiment in a case where the present invention is applied to a content distribution system in which a content provider performs content distribution using a satellite broadcast.

Figure 7:
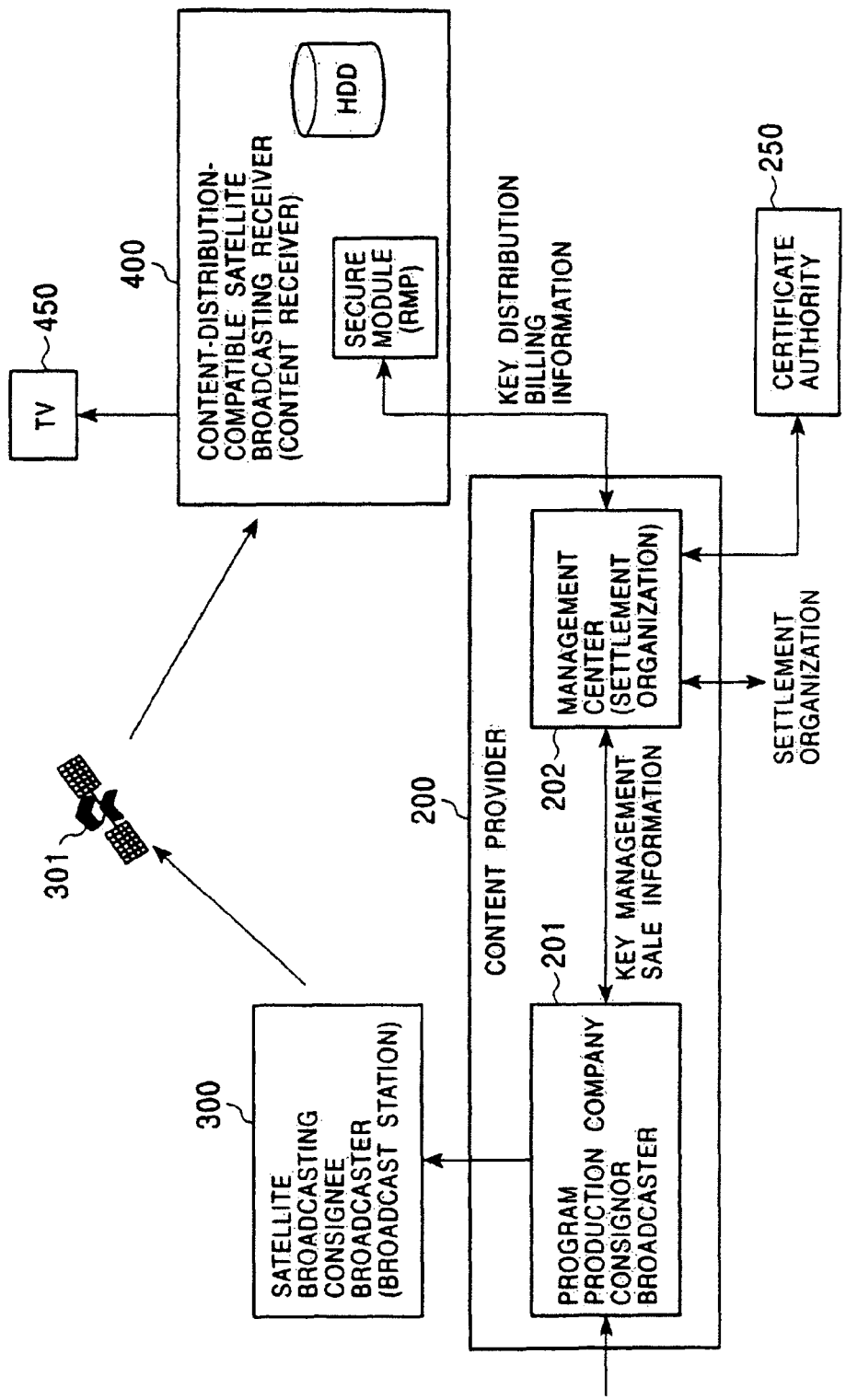
FIG. 7 shows the general construction of a content distribution system.

FIG. 7 shows the general construction of a content distribution system 100. The content distribution system 100 shown in FIG. 7 comprises a content provider 200 formed of a program production company for producing/providing content or a consignor broadcaster, a satellite broadcast consignee broadcaster (hereinafter referred to simply as a "broadcasting station") 300 for distributing the produced/provided content by using satellite broadcast waves, and a content-distribution-compatible satellite broadcast receiver 400 (hereinafter referred to simply as a "content receiver"), disposed in each ordinary household. The broadcast receiver 400 is typically connected to a television (TV) 450 for outputting audio and video.

Between the content provider 200 and the broadcasting station 300, a consignment contract concerning content production/provision is exchanged, and the content produced by the content provider 200 (or obtained from an external content provider) is provided to the broadcasting station 300. The broadcasting station 300 encrypts the content, and causes this content to be carried as satellite broadcast waves and distributes the content to the broadcast receiver 400 within each household.

The content provider 200 may have a contract with an organization which is dedicated to settlements, such as an external management center 202, which manages content billing, which is independent of a program production company 201, as a content producer. In such a case, the content provider 200 entrusts a key for encrypting content to the management center 202, and the management center 202, passes the content sales information.

The management center 202, may further be linked with an external certificate authority 250 and another settlement organization. Furthermore, the management center 202, which is connected periodically or non-periodically to an individual broadcast receiver 400, distributes to the broadcast receiver 400 key information for allowing encrypted content to be used. The broadcast receiver 400 uses the distributed key information in order to decrypt the encrypted content which is received via a broadcasting satellite 301 in accordance with the RMP specification description, so that the content is used. Furthermore, the broadcast receiver 400 has built therein a large-capacity external storage device, such as a hard disk device, so that the received content can be stored.

Also, billing information, such as a content playback log, is sent from the broadcast receiver 400 to the program production company 201. The user on the broadcast receiver 400 side needs only to settle the bill amount corresponding to the number of times the content is used monthly with the management center. The settlement method may be any one of a cash payment, a transfer to a predetermined financial institution, a credit settlement using a credit card, an instant settlement using a debit card, and the use of electronic money.

Figure 8:
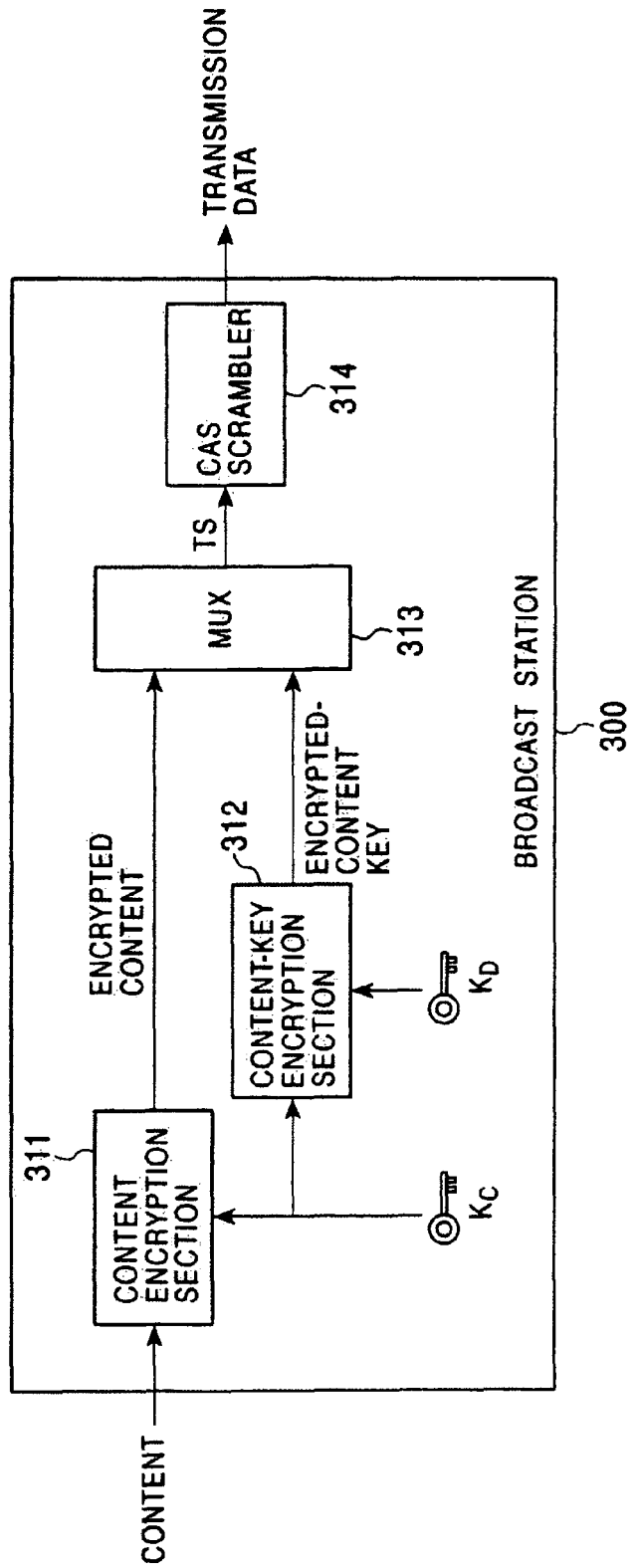
FIG. 8 schematically shows the construction of a broadcasting station for producing and distributing content.

FIG. 8 schematically shows the construction of a broadcasting station 300 for producing and distributing content. A description will now be given below of how encryption is performed during content distribution with reference to FIG. 8.

A content encryption section 311 encrypts content, such as video and music, provided from a content provider, by using a content key Kc. However, it is assumed that the content provided from the content provider has been subjected to rights processing by the content provider, including encryption conforming to the RMP specification description.

A content-key encryption section 312 encrypts the content key Kc using a distribution key KD.

A multiplexer 313 multiplexes encrypted content input from the content encryption section 311 together with the encrypted-content key input from the content-key encryption section 312 in order to create a transport stream TS. The transport stream is a data stream in which metadata and the encrypted-content key are added to the encrypted content.

A CAS scrambler 314 scrambles, that is, decomposes the transport stream so that a conditional reception is made on the broadcast receiver 400. The contract information, the scrambling key, etc., in the CAS are, for example, encrypted by an encryption device (not shown) and are carried as broadcast waves, so that they can be transmitted to the broadcast receiver 400.

Figure 9:
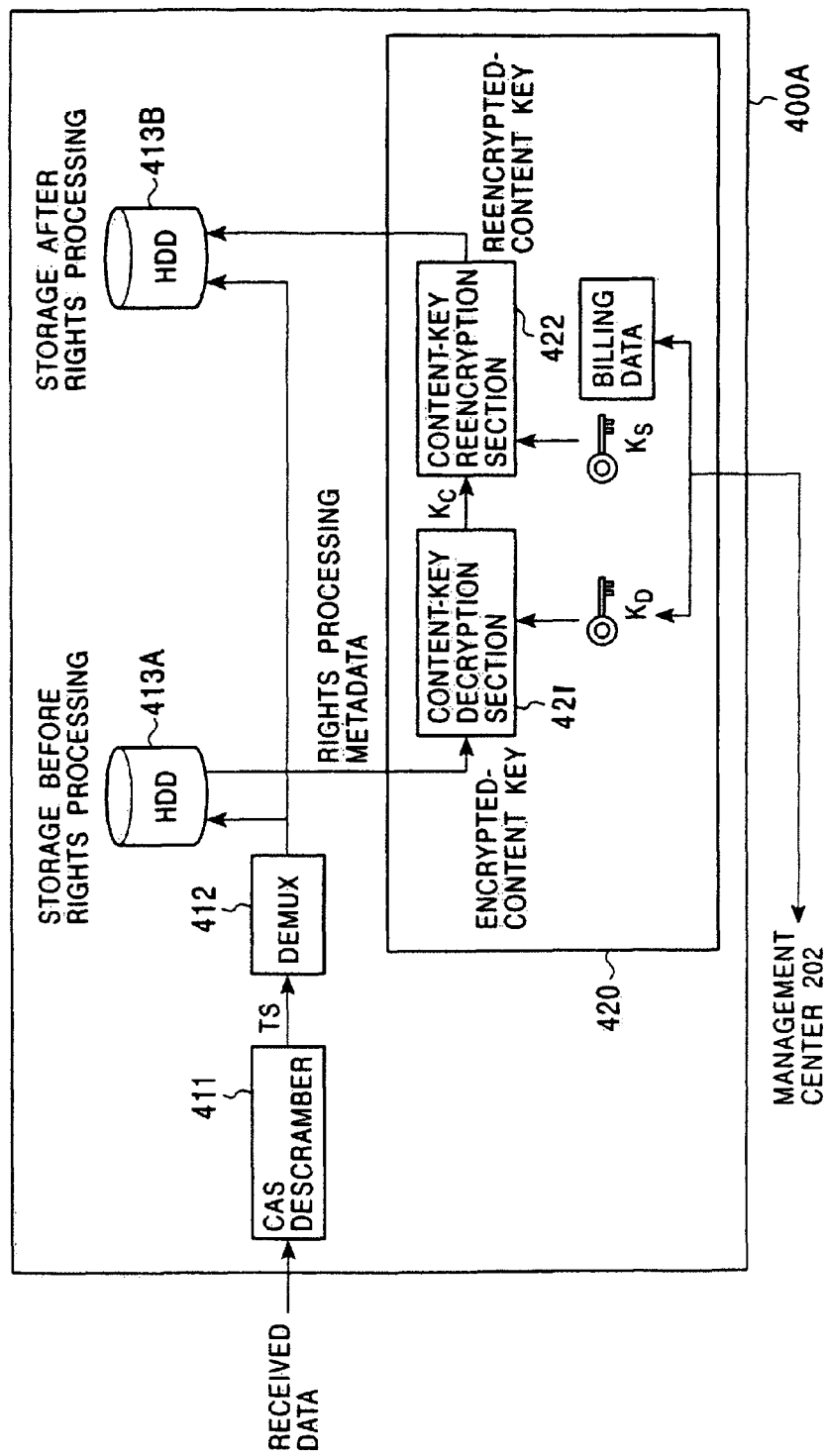
FIG. 9 schematically shows the construction of an example content receiver 400A for receiving distributed content which is carried as broadcast waves.

FIG. 9 schematically shows the construction of an example content receiver 400A for receiving distributed content which is carried as broadcast waves. The content receiver 400A shown in FIG. 9 is of a type in which, after the received content is temporarily stored in a predetermined local storage device such as a hard disk, purchasing of content is decided. Referring to FIG. 9, the content receiver 400A will be described below.

A CAS descrambler 411 descrambles the data received from the front-end section (not shown) by using a scrambling key obtained from the broadcasting station 300, and plays back the transport stream.

A demultiplexer 412 demultiplexes the transport stream into the encrypted content and the encrypted-content key. After the demultiplexing, these are temporarily stored in a hard disk device 413A so as to be kept in a state before rights processing.

An RMP module 420 may be implemented in the form of any one of a hardware module and a software module. When the content stored in the hard disk device 413A is to be purchased, it is assumed that corresponding rights processing metadata is first read, RMP identification information (RMP ID) is detected therefrom, and an appropriate RMP module is operating selectively.

The RMP module 420 connects with the management center 202, with which a contract concerning a contract purchase is exchanged (or a user account is obtained) in order to purchase a content distribution key KD. A content-key decryption section 421 extracts an encrypted-content key from the rights processing metadata, and decrypts this key using the distribution key KD in order to obtain a content key Kc. A content-key reencryption section 422, which follows, reencrypts the content key Kc by using a content storage key Ks which is specified by the RMP module 420.

The purchased encrypted content is transferred, together with the reencrypted content key, from the hard disk device 413A to a hard disk device 413B. However, the hard disk devices 413A and 413B need not be devices which are physically independent of each other, and may be storage areas (for example, partitions) which are separated between before rights processing (before purchasing) and after rights processing (after purchasing) within the same hard disk.

The RMP module 420 stores, as billing data, a processing log such as purchasing of the distribution key KD for content to be purchased, and transfer of the purchased content. Then, the RMP module 420 connects periodically or non-periodically to the management center 202, and transfers billing data.

Figure 10:
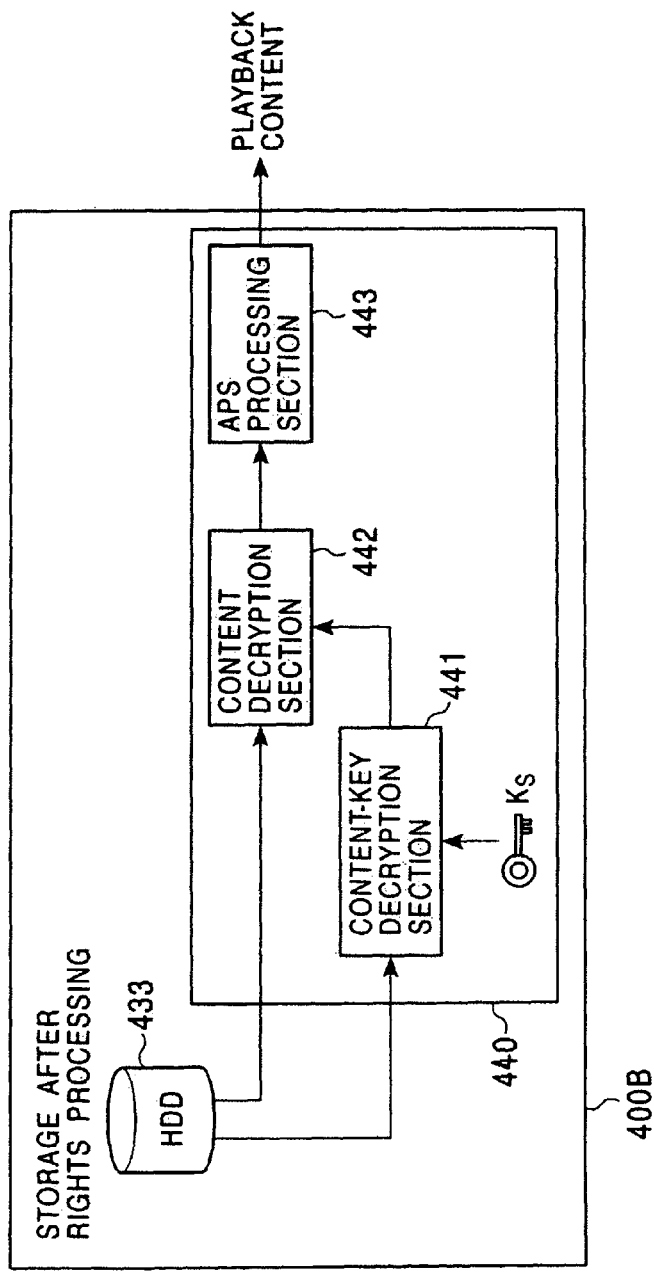
FIG. 10 schematically shows the construction of another example content receiver 400B for receiving distributed content which is carried as broadcast waves.

FIG. 10 schematically shows the construction of another example content receiver 400B for receiving distributed content which is carried as broadcast waves. The content receiver 400B shown in FIG. 10 is of a type in which, after received content is stored temporarily in a local storage device such as a hard disk, the content is played back. The content receiver 400A also functions as a playback device for playing back encrypted content which is purchased/stored by the above-described content receiver 400A. Referring to FIG. 10, the content receiver 400B will now be described below.

In a hard disk device 433 are stored content which is encrypted using the content key Kc specified by an RMP module 440 and an encrypted-content key which is encrypted using a content storage key Ks specified by the RMP module 440.

When content is to be purchased, a content-key decryption section 441 reads the corresponding encrypted-content key from the hard disk device 433, and decrypts this key using the specified storage key Ks in order to obtain a content key Kc.

A content decryption section 442 reads encrypted content which is desired to be purchased from the hard disk device 433, and decrypts this content using the decrypted content key Kc in order to play back the original content such as video or music.

An APS processing section 443 performs a content protection process, such as macrovision or CGMS-A, on analog output signals such as video signals, and, thereafter, sends the signals, as playback content, to an output device such as a television (not shown).

According to such a content receiver 400A as that shown in FIGS. 9 and 10, it is possible for the content provider to distribute content by an encryption system which is independent of CAS. More specifically, since the encryption system is a content distribution system which is independent of CAS, it is possible to perform a billing process for a content purchase on a common platform across different CAS systems (different broadcasters). In this case, the CAS is merely a content distribution path. The content is stored in a local storage device such as a hard disk device so as to be kept in an encrypted state. Since, when purchasing, a key for decrypting content is changed from the content key Kc to the storage key Ks, thereafter, playback is possible at any given time on the same content receiver 400A. Also, since a log for billing during a content purchasing process is created, and the log is transmitted to the management center 202, periodically or non-periodically, it is possible to reliably perform billing and settlement with respect to content users.

Figure 11:
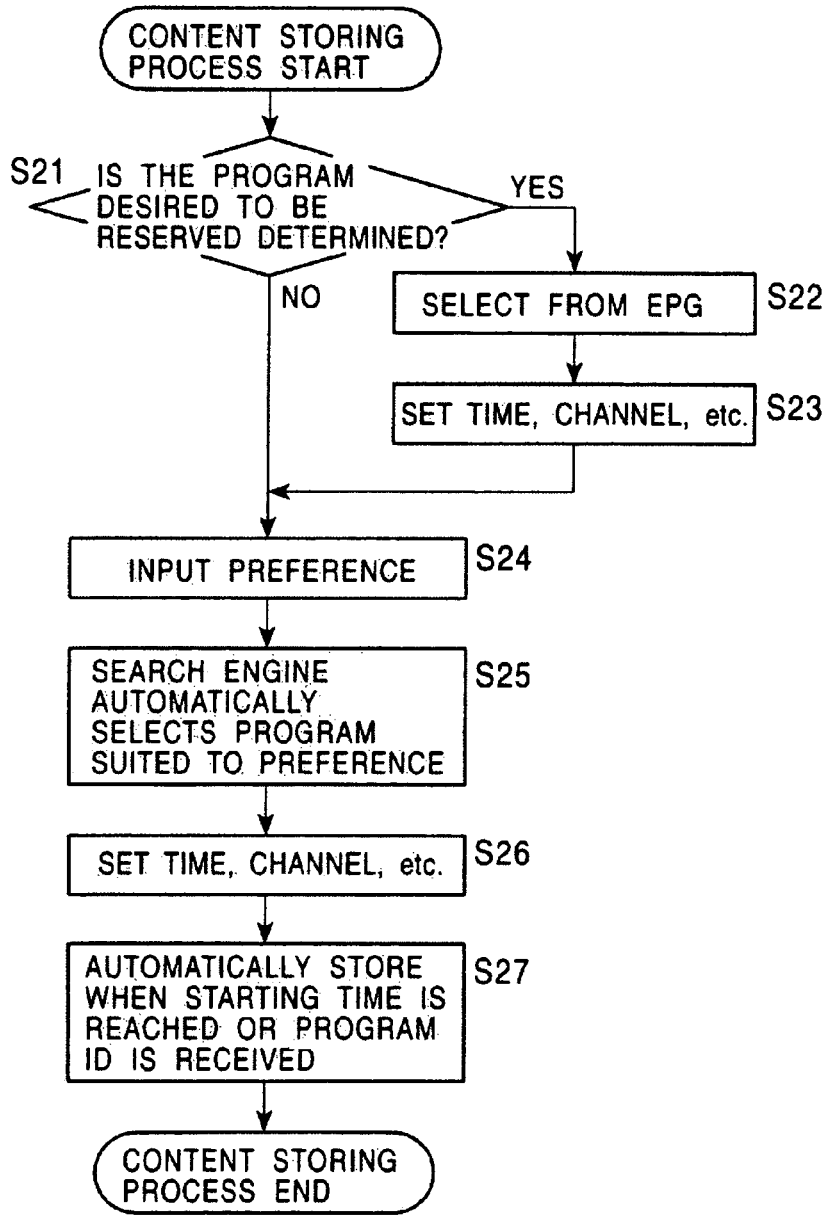
FIG. 11 is a flowchart showing another example of a processing procedure for storing received content in a hard disk device in the content receiver 400A shown in FIG. 9.

FIG. 11 shows, in a flowchart, an example of a processing procedure for storing received content in a hard disk device 413A, in such a content receiver 400A as that shown in FIG. 9. The received content is basically stored so as to be kept as before rights processing. A description will now be given below of a content storing process in accordance with this flowchart.

Initially, it is checked whether or not a program desired to be reserved by a user of the content receiver 400A is determined (that is, whether or not a reservation is set) (step S21).

When a program desired to be reserved has already been decided, for example, in the case of a digital broadcast, an EPG (Electronic Program Guide) is extracted from data for a data broadcast, and a program to be reserved is selected on the basis of the EPG (step S22). Then, a time to be reserved (a broadcasting duration), a channel, etc., are set (step S23).

Next, based on a preference input (step S24) from the user, a predetermined search engine automatically selects a program which matches the preference (step S25). Then, a time to be reserved (a duration), a channel, etc., are set (step S26).

In response to the reserved start time being reached or the selected program ID being received, the received content is automatically stored in the hard disk device (step S27).

Figure 12:
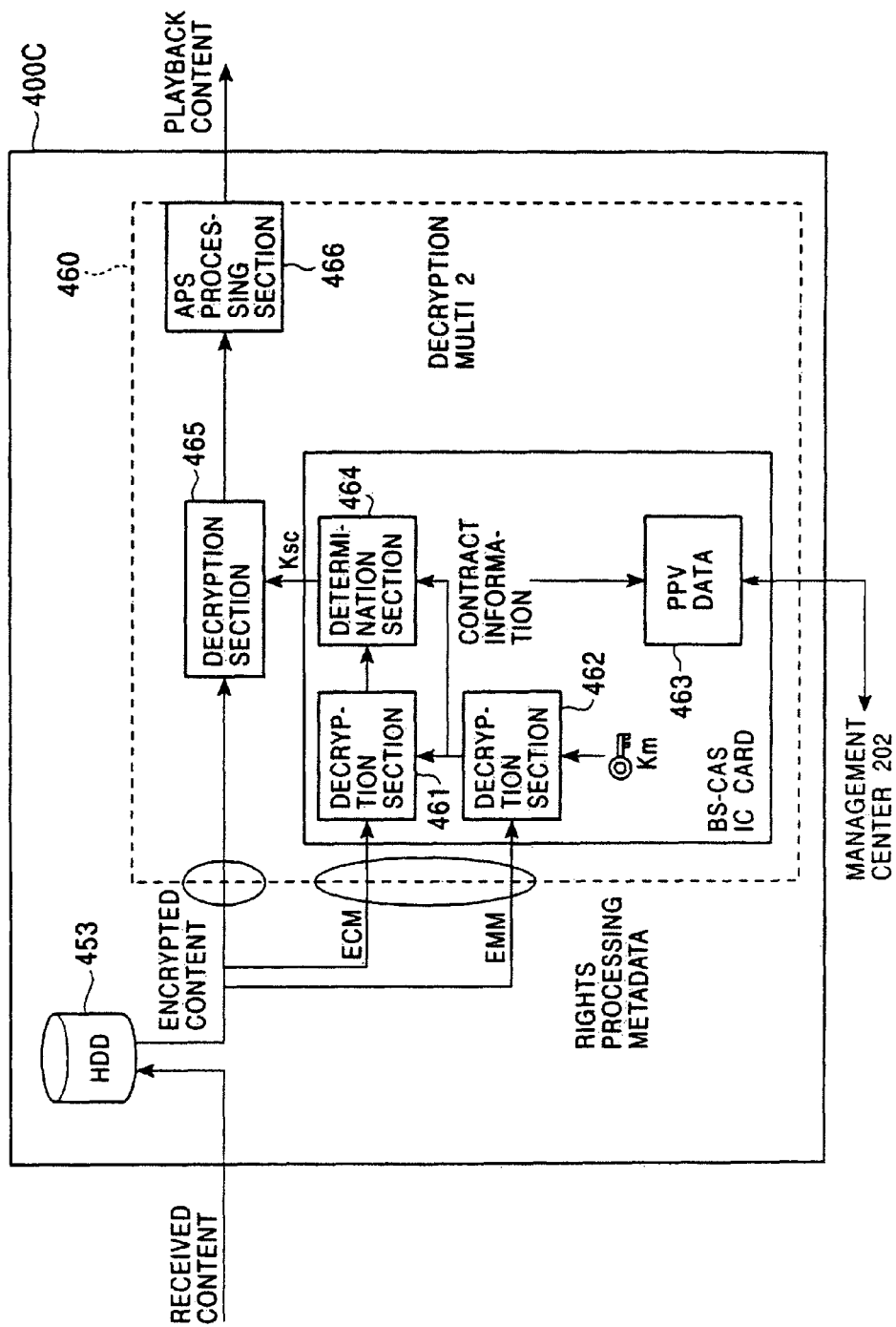
FIG. 12 schematically shows the construction of another example content receiver 400C for receiving distributed content which is carried as broadcast waves.

FIG. 12 schematically shows the construction of another example content receiver 400C for receiving distributed content which is carried as broadcast waves. The content receiver 400C shown in FIG. 12 is of a type in which a CAS module for a satellite broadcast, which is formed as an IC card, that is, a BS-CAS IC card, is contained, and after the received content is temporarily stored in the hard disk device, a satellite broadcast is conditionally received and is viewed on the basis of the CAS system. Referring to FIG. 12, the content receiver 400C will now be described below.

Data content received by a front-end section (not shown) is temporarily stored in a large-capacity storage device such as a hard disk device 453 so as to be kept in a state before rights processing and as being scrambled by CAS.

The rights processing for the received content is performed by an RMP module 460. The RMP module 460 may be implemented in the form of any one of a hardware module and a software module. It is assumed that, when content stored in the hard disk device 453 is to be purchased, corresponding rights processing metadata is read, RMP identification information (RMP ID) is detected, and an appropriate RMP module is selectively operated. In the example shown in FIG. 12, the CAS module provided as an IC card constitutes a part of the RMP module 460.

When the stored content is to be played back, the corresponding rights processing metadata is read from the hard disk device 453.

The rights processing metadata contains an ECM (Entitlement Control Message) and an EMM (Entitlement Management Message). The ECM is such that a scrambling key Ksc for decrypting a CAS scramble is encrypted. Also, the EMM is such that a work key for decrypting the ECM is encrypted together with contract contents, such as a contract period, and the message.

A decryption section 462 decrypts the EMM using a master key Km recorded on the BS-CAS IC card in order to obtain a work key and contract information. Next, a decryption section 461 decrypts the ECM using the work key in order to obtain a scrambling key Ksc.

A determination section 464 verifies the validity of the content receiver 400C on the basis of the contract information obtained by the decryption section 462. When it is determined that the content receiver 400C is valid, the scrambling key Ksc is supplied to a decryption section 465.

The received content stored in the hard disk device 453 is scrambled in advance by a method, such as Multi2, on the basis of CAS. The decryption section 465 extracts content desired to be played back, that is, desired to be viewed, from the hard disk device 453, and performs a descrambling process thereon using the scrambling key Ksc.

An APS processing section 466 performs a content protection process such as macrovision and CGMS-A on analog output signals such as video signals, and, thereafter, sends the signals, as playback content, to an output device such as a television (not shown).

On the other hand, the contract information obtained by the decryption section 462 is stored in a pay-per-view (PPV) data storage section 463. The RMP module 460 connects with the management center 202, periodically or non-periodically, and transfers PPV data. The management center 202, can perform a billing process with respect to content users on the basis of the PPV data.

According to the construction of the content receiver 400C shown in FIG. 12, CAS can be directly used to bill the stored content. The content which is encrypted in accordance with the CAS is stored so as to be kept in an encrypted state, in the hard disk device. By decrypting the EMM and the ECM using the master key Km used in CAS, the stored content can be decrypted. At that time, the fact that encryption is decrypted is recorded as a billing log. By transmitting such a billing log to the management center periodically or non-periodically, it is possible to reliably perform a billing with respect to content users.

Figure 13:
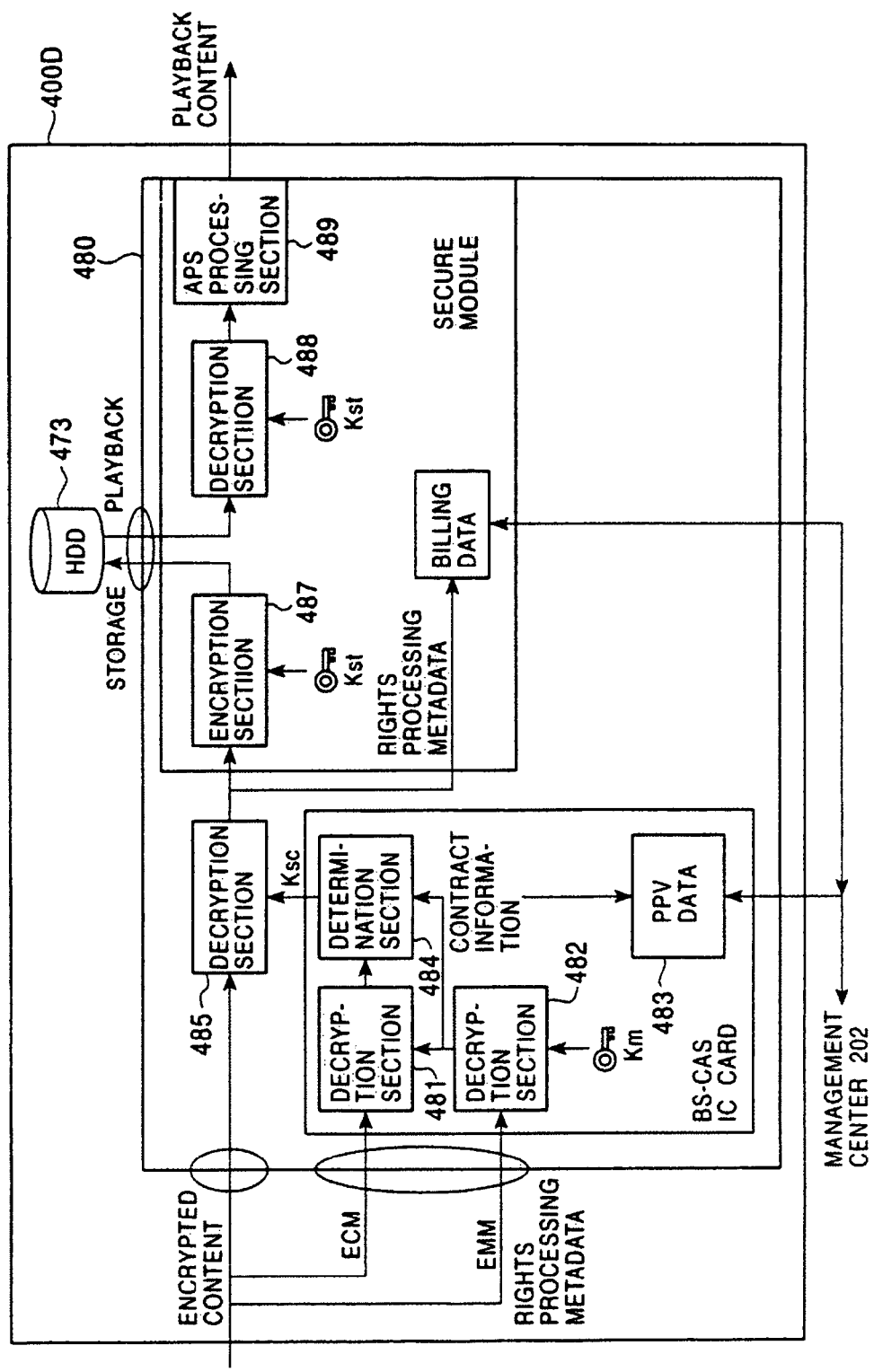
FIG. 13 schematically shows the construction of another example content receiver 400D for receiving distributed content which is carried as broadcast waves.
Figure 14:
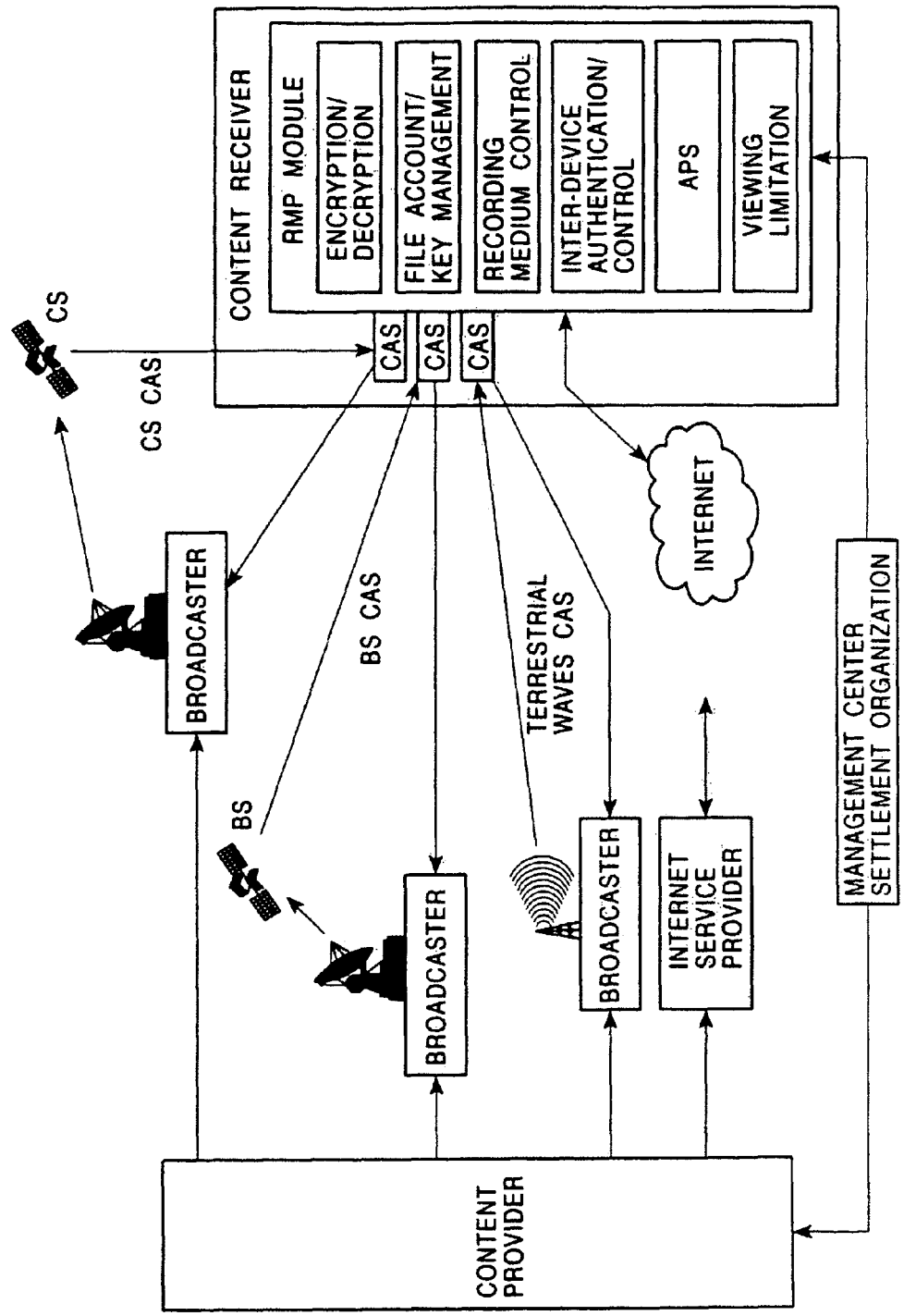
FIG. 14 shows the general construction of a CAS-based content distribution system.

FIG. 13 schematically shows the construction of another example content receiver 400D for receiving distributed content which is carried as broadcast waves. The content receiver 400D shown in FIG. 13 is of a type in which a CAS module for a satellite broadcast, which is formed into an IC card, that is, a BS-CAS IC card, is contained, and after a satellite broadcast is conditionally received on the basis of the CAS system and is CAS-descrambled, the satellite broadcast is reencrypted and is stored in the hard disk device. Referring to FIG. 13, the content receiver 400D will now be described below.

The rights processing for the received content is performed by an RMP module 480. The RMP module 480 may be implemented in the form of any one of a hardware module and a software module. It is assumed that, when content is received by a front-end section (not shown), corresponding rights processing metadata is read, RMP identification information (RMP ID) is detected, and an appropriate RMP module is selectively operated. In the example shown in FIG. 13, the CAS module provided as an IC card and a secure module for protecting content to be stored in the hard disk device constitute a part of the RMP module 480. The secure module performs a process for reencrypting content to be stored in the hard disk device and a process for decrypting encryption during playback.

Of the data content received by the front-end section (not shown), the rights processing metadata is input to the CAS module, that is, the BS-CAS IC card.

The rights processing metadata contains an ECM (Entitlement Control Message) and an EMM (Entitlement Management Message). A decryption section 482 decrypts the EMM using a master key Km recorded on the BS-CAS IC card in order to obtain a work key and contract information. Next, a decryption section 481 decrypts the ECM using the work key in order to obtain a scrambling key Ksc. Also, the contract information obtained by the decryption section 482 is stored in a PPV data storage section 483.

A determination section 484 verifies the validity of the content receiver 400D on the basis of the contract information obtained by the decryption section 482. When it is determined that the content receiver 400D is valid, the scrambling key Ksc is supplied to a decryption section 485.

The decryption section 485 performs a descrambling process on received content by using the scrambling key Ksc and outputs the content to the secure module.

In the secure module, an encryption section 487 reencrypts content after CAS descrambling by using a content storage key Kst which is specific to the content receiver 400D, and stores the content in a hard disk device 473.

When the content stored in the hard disk device 473 is to be played back, that is, to be viewed, the encrypted content is read from the hard disk device 473 and is decrypted by a decryption section 488 using the content storage key Kst. Then, an APS processing section 489 performs a content protection process, such as macrovision or CGMS-A, on analog output signals such as video signals, and, thereafter, sends the signals, as playback content, to an output device such as a television (not shown).

Also, in the secure module, rights processing metadata is extracted from the content after CAS descrambling, and is stored as billing data.

The RMP module 480 connects with the management center 202, periodically or non-periodically, and transfers PPV data stored in the CAS module and billing data stored in the secure module. The management center 202, can perform a billing process with respect to content users on the basis of the PPV data.

According to the content receiver 400D constructed as shown in FIG. 13, content which is distributed according to the CAS system can be reencrypted and stored in the hard disk device. During reencryption, encryption is performed using a content storage key Kst having a key structure differing from the scrambling key Ksc used in CAS. When the encrypted content stored in the hard disk device is to be played back, a billing log is created each time the content is played back and is transmitted to the management center 202, periodically or non-periodically, so that billing with respect to a content user is performed. CAS can also be integrally formed with the RMP module.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A content receiving apparatus, comprising:
   a receiver operable to receive content distributed in accordance with at least one of a plurality of different rights management and protection methods and to receive rights processing metadata associated with the received content;
   an identification unit operable to identify, based on identification information contained within the rights processing metadata, a particular one of the plurality of different rights management and protection methods that is associated with the identification information; and
   a rights processing unit having a plurality of different rights management and protection modules respectively associated with corresponding ones of the plurality of different rights management and protection methods,
   said identification unit being operable to determine whether any one of the plurality of different rights management and protection modules is associated with the identified one of the plurality of different rights management and protection methods, and
      in response to determining that one of the plurality of different rights management and protection modules is associated with the identified one of the plurality of different rights management and protection methods, to activate that rights management and protection module, and
      in response to determining that none of the plurality of different rights management and protection modules is associated with the identified one of the plurality of different rights management and protection methods, to connect to a rights management and protection source external to said content receiving apparatus, to download the rights management and protection module associated with the identified one of the plurality of different rights management and protection methods from the rights management and protection source, to load the downloaded rights management and protection module into said rights processing unit, and to activate the loaded rights management and protection module,
   the activated rights management and protection module being used to perform rights processing of the received content according to the identified one of the plurality of different rights management and protection methods.

2. A content receiving apparatus according to claim 1, wherein the plurality of different rights management and protection methods specify one or more indispensable items for purchasing and using the content and include at least one of a content encryption method, a key distribution method, a content decryption method, a billing information and keys transmission method, recording medium control information, a mutual authentication method, an analog protection system, a copy generation management system, or viewing limitation information.

3. A content receiving apparatus according to claim 1, further comprising a rights management and protection module acquiring unit operable to externally acquire the rights management and protection module associated with the identified one of the plurality of different rights management and protection methods in response to said identification unit determining that none of the plurality of different rights management and protection modules is associated with the identified one of the plurality of different rights management and protection methods.

4. A content receiving apparatus according to claim 1, further comprising a rights management and protection module creation unit operable to automatically create the rights management and protection module associated with the identified one of the plurality of different rights management and protection methods in response to said identification unit determining that none of the plurality of different rights management and protection modules is associated with the identified one of the plurality of different rights management and protection methods.

5. A content receiving apparatus according to claim 1, further comprising a content storage unit operable to store the received content.

6. A content receiving apparatus according to claim 1, further comprising a content storage unit operable to store the received content before rights processing is performed by the rights processing unit.

7. A content receiving apparatus according to claim 1, further comprising a content storage unit operable to store the received content after rights processing is performed by the rights processing unit.

8. A content receiving apparatus according to claim 1, wherein the receiver is operable to receive the content encrypted by a predetermined key, the receiver including a content storage unit operable to store the content, and the rights processing unit being operable to decrypt the received content to form decrypted content, to reencrypt the decrypted content using another key, and to store the reencrypted content in the content storage unit.

9. A content receiving apparatus according to claim 1, wherein the receiver is operable to receive encrypted content encrypted by a predetermined key and the predetermined key encrypted by a second key, the receiver including a content storage unit, and the rights processing unit being operable to decrypt the predetermined key to form a decrypted key, to reencrypt the decrypted key using another key, and to store the reencrypted key and the encrypted content in the content storage unit.

10. A content receiving apparatus according to claim 1, wherein the rights processing unit is operable to store a log regarding rights processing of the received content.

11. A content receiving apparatus according to claim 1, wherein the rights processing unit is operable to obtain a playback signal by performing the rights processing of the received content based on the identified rights management and protection method, at least one of the rights management and protection modules being operable to process the playback signal according to an analog protection system process, and the content receiving apparatus being operable to externally output the processed playback signal.

12. A content receiving apparatus according to claim 1, wherein the rights processing unit is operable to encrypt the received content after performing the rights processing, and the content receiving apparatus is operable to externally output the encrypted content.

13. A content receiving apparatus, comprising:
a receiver operable to receive content encrypted by a predetermined key and distributed in accordance with at least one of a plurality of different rights management and protection methods and to receive rights processing metadata associated with the received content;
a content storage unit operable to store the received content and the received rights processing metadata;
an identification unit operable to identify, based on identification information contained within the rights processing metadata, a corresponding one of the plurality of different rights management and protection methods; and
a rights processing unit having a plurality of different rights management and protection modules respectively associated with corresponding ones of the plurality of different rights management and protection methods;
said identification unit being operable to determine whether any of the plurality of different rights management and protection modules is associated with the identified one of the plurality of different rights management and protection methods, and
in response to determining that one of the plurality of different rights management and protection modules is associated with the identified one of the plurality of different rights management and protection methods, to activate that rights management and protection module, and
in response to determining that none of the plurality of different rights management and protection modules is associated with the identified one of the plurality of different rights management and protection methods, to connect to a rights management and protection source external to said content receiving apparatus, to download the rights management and protection module associated with the identified one of the plurality of different rights management and protection methods from the rights management and protection source, to load the downloaded rights management and protection module into said rights processing unit, and to activate the loaded rights management and protection module,
the activated rights management and protection module being used to perform rights processing of the received content according to the identified one of the plurality of different rights management and protection methods, to decrypt the received content using the predetermined key, to reencrypt the decrypted content using another key, and to store the reencrypted content in the content storage unit.

14. The content receiving apparatus as claimed in claim 13, wherein the receiver is operable to receive the predetermined key encrypted by a second key, and the rights processing unit is operable to decrypt the predetermined key to form a decrypted key, to reencrypt the decrypted key using the another key to form a reencrypted key, and to store the reencrypted key and the received content in encrypted form in the content storage unit.

15. A computer-readable medium having recorded thereon a program having instructions, that, upon being executed, cause a content receiving apparatus to perform a method of receiving content, said method comprising:

receiving content distributed in accordance with one of a plurality of different rights management and protection methods;
receiving rights processing metadata associated with the content;
identifying, based on identification information contained within the rights processing metadata, a particular one of the plurality of different rights management and protection methods that is associated with the identification information;
determining whether any one of a plurality of different rights management and protection modules is associated with the identified one of the plurality of different rights management and protection methods, the plurality of different rights management and protection modules being respectively associated with corresponding ones of the plurality of different rights management and protection methods;
in response to determining that one of the plurality of different rights management and protection module is associated with the identified one of the plurality of different rights management and protection methods, activating that rights management and protection module;
in response to determining that none of the plurality of different rights management and protection module is associated with the identified one of the plurality of different rights management and protection methods,
connecting to an external rights management and protection source,
downloading the rights management and protection module associated with the identified one of the plurality of different rights management and protection methods from the rights management and protection source,
loading the downloaded rights management and protection module, and
activating the loaded rights management and protection module; and
using the activated rights management and protection module to perform rights processing of the received content according to the identified one of the plurality of different rights management and protection methods to permit or deny access to the received content.

16. The computer-readable medium as claimed in claim 15, wherein the plurality of different rights management and protection methods specify one or more indispensable items for purchasing and using the content, including at least one of a content encryption method, a key distribution method, a content decryption method, a billing information and keys transmission method, recording medium control information, a mutual authentication method, an analog protection system, a copy generation management system, or viewing limitation information.

17. The computer-readable medium as claimed in claim 15, wherein in response to determining that the currently loaded rights management and protection modules is not associated with the identified one of the plurality of different rights management and protection methods, the content receiving method further comprises externally acquiring the rights management and protection module associated with the identified one of the plurality of different rights management and protection methods prior to loading that rights management and protection module.

18. The computer-readable medium as claimed in claim 15, wherein the content receiving method further comprises automatically creating the rights management and protection module associated with the identified one of the plurality of different rights management and protection methods prior to loading that rights management and protection module.

19. The computer-readable medium as claimed in claim 15, wherein the step of receiving content includes receiving the content encrypted by a predetermined key, and the content receiving method further comprises:
    decrypting the encrypted content to form decrypted content;
    reencrypting the decrypted content using another key; and
    storing the reencrypted content.

20. The computer-readable medium as claimed in claim 15, wherein the step of receiving content includes receiving the content encrypted by a predetermined key and receiving the predetermined key encrypted by a second key, and the content receiving method further comprises:
    decrypting the predetermined key to form a decrypted key;
    reencrypting the decrypted key using another key; and
    storing the reencrypted key and the encrypted content.

21. The computer-readable medium as claimed in claim 15, wherein the content receiving method further comprises:
    performing the rights processing of the received content based on the identified rights management and protection method to obtain a playback signal;
    performing an analog protection system process on the playback signal; and
    externally outputting the processed playback signal.

22. The computer-readable medium as claimed in claim 15, wherein the content receiving method further comprises encrypting the received content after performing the rights processing and externally outputting the encrypted content.

* * * * *